US010976895B2

(12) United States Patent
Han

(10) Patent No.: US 10,976,895 B2
(45) Date of Patent: Apr. 13, 2021

(54) ELECTRONIC APPARATUS AND CONTROLLING METHOD THEREOF

(71) Applicant: SAMSUNG ELECTRONICS CO., LTD., Suwon-si (KR)

(72) Inventor: Ji-Youn Han, Seoul (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 121 days.

(21) Appl. No.: 15/651,092

(22) Filed: Jul. 17, 2017

(65) Prior Publication Data
US 2018/0088751 A1 Mar. 29, 2018

(30) Foreign Application Priority Data
Sep. 23, 2016 (KR) .................. 10-2016-0122192

(51) Int. Cl.
*G06F 3/048* (2013.01)
*G06F 3/0482* (2013.01)
(Continued)

(52) U.S. Cl.
CPC .......... *G06F 3/0482* (2013.01); *G06F 3/0483* (2013.01); *G06F 3/0486* (2013.01);
(Continued)

(58) Field of Classification Search
CPC .. G06F 3/0482; G06F 3/04817; G06F 3/0488; G06F 3/0486; G06F 3/04842;
(Continued)

(56) References Cited
U.S. PATENT DOCUMENTS 7,930,329 B2   4/2011   Lee et al.
8,120,590 B2 * 2/2012   Lee ..................... G06F 3/04883
                                                              345/173
(Continued)

FOREIGN PATENT DOCUMENTS

JP    201258877 A    3/2012
JP    5003075 B2     8/2012
(Continued)

OTHER PUBLICATIONS

Casey et al., Content-Based Music Information Retrieval: Current Directions and Future Challenges; IEEE; 2008; 29 pages.*
(Continued)

*Primary Examiner* — Linh K Pham
(74) *Attorney, Agent, or Firm* — Sughrue Mion, PLLC

(57) ABSTRACT

An electronic apparatus and a controlling method are provided. The controlling method of an electronic apparatus includes displaying a content list including a plurality of display items corresponding to a plurality of contents, acquiring category information of a content corresponding to a first display item in response to sensing a first user interaction corresponding to a first display item from among the plurality of display items, displaying a plurality of category items representing the acquired category information around the first display item, and reproducing a content having category information corresponding to at least one of a plurality of selected category items in response to sensing a second user interaction of selecting at least the at least one of the plurality of category items.

17 Claims, 20 Drawing Sheets

(51) Int. Cl.

| | | |
|---|---|---|
| *G06F 3/0488* | (2013.01) | |
| *G06F 3/0486* | (2013.01) | |
| *G06F 3/0484* | (2013.01) | |
| *H04N 21/422* | (2011.01) | |
| *H04N 21/431* | (2011.01) | |
| *H04N 21/414* | (2011.01) | |
| *H04N 21/482* | (2011.01) | |
| *H04N 21/84* | (2011.01) | |
| *G06F 3/0481* | (2013.01) | |
| *G06F 3/0483* | (2013.01) | |

(52) U.S. Cl.
CPC ........ *G06F 3/0488* (2013.01); *G06F 3/04817* (2013.01); *G06F 3/04842* (2013.01); *G06F 3/04845* (2013.01); *G06F 3/04883* (2013.01); *H04N 21/41407* (2013.01); *H04N 21/42224* (2013.01); *H04N 21/4314* (2013.01); *H04N 21/4821* (2013.01); *H04N 21/4828* (2013.01); *H04N 21/84* (2013.01)

(58) Field of Classification Search
CPC ........ G06F 16/40; G06F 16/58; G06F 3/0484; G06F 16/285; G06F 16/5838; H04N 5/232933; H04N 1/00196; H04N 5/232939; H04N 2201/0008; H04N 2201/3214; H04N 2201/3215
See application file for complete search history.

(56) References Cited

U.S. PATENT DOCUMENTS

| | | | |
|---|---|---|---|
| 8,230,340 B2 | 7/2012 | Kang et al. | |
| 8,315,950 B2 | 11/2012 | Conley et al. | |
| 8,725,063 B2 | 5/2014 | Krampf et al. | |
| 2007/0027855 A1* | 2/2007 | Kagawa | G06F 16/904 |
| 2007/0226640 A1* | 9/2007 | Holbrook | G06F 16/951 |
| | | | 715/765 |
| 2007/0255747 A1* | 11/2007 | Lee | G06F 16/44 |
| 2008/0066099 A1 | 3/2008 | Brodersen et al. | |
| 2008/0074985 A1 | 3/2008 | Mukaiyama et al. | |
| 2009/0182721 A1* | 7/2009 | Yang | G06F 16/532 |
| 2009/0183075 A1* | 7/2009 | Kang | G06F 16/4387 |
| | | | 715/716 |
| 2010/0318927 A1* | 12/2010 | Sloo | G06F 3/0482 |
| | | | 715/764 |
| 2011/0025632 A1* | 2/2011 | Lee | G06F 3/0482 |
| | | | 345/173 |
| 2011/0254792 A1* | 10/2011 | Waters | G06F 1/1626 |
| | | | 345/173 |
| 2011/0296308 A1* | 12/2011 | Yi | G06F 21/52 |
| | | | 715/733 |
| 2012/0030619 A1 | 2/2012 | Lee et al. | |
| 2012/0272171 A1* | 10/2012 | Icho | G06T 11/60 |
| | | | 715/771 |
| 2013/0167029 A1 | 6/2013 | Friesen et al. | |
| 2013/0268894 A1* | 10/2013 | Jeon | G06F 3/04883 |
| | | | 715/835 |
| 2014/0078083 A1 | 3/2014 | Yeom | |
| 2014/0337771 A1 | 11/2014 | Jung et al. | |
| 2014/0375862 A1* | 12/2014 | Kim | H04N 5/23203 |
| | | | 348/333.02 |
| 2015/0033184 A1* | 1/2015 | Kim | G06F 3/0482 |
| | | | 715/808 |
| 2015/0348055 A1 | 12/2015 | Smits | |
| 2016/0028876 A1 | 1/2016 | Brown | |
| 2016/0054851 A1* | 2/2016 | Kim | G06F 3/03545 |
| | | | 345/174 |
| 2016/0098426 A1* | 4/2016 | Sayko | G06F 16/951 |
| | | | 707/770 |
| 2016/0188197 A1 | 6/2016 | Ryu et al. | |
| 2016/0342308 A1* | 11/2016 | Aggarwal | G06F 3/04817 |
| 2017/0013200 A1* | 1/2017 | Shirakawa | G06F 3/048 |

FOREIGN PATENT DOCUMENTS

| | | |
|---|---|---|
| KR | 10-0714727 B1 | 5/2007 |
| KR | 10-2009-0078570 A | 7/2009 |
| KR | 1020140035581 A | 3/2014 |
| KR | 1020140133269 A | 11/2014 |
| KR | 101580300 B1 | 12/2015 |

OTHER PUBLICATIONS

Communication issued by the International Searching Authority dated Nov. 24, 2017 in counterpart International Application No. PCT/KR2017/009039 (PCT/ISA/210 & PCT/ISA/237).
Communication dated Jun. 4, 2019, from the European Patent Office in counterpart European Application No. 17853301.4.
Communication dated Jul. 27, 2020 issued by the Korean Intellectual Property Office in counterpart Korean Application No. 10-2016-0122192.
Communication dated Jan. 28, 2021 issued by the European Patent Office in application No. 17853301.4.
Communication dated Jan. 5, 2021 issued by the Intellectual Property India Patent Office in application No. 201947008067.
Communication dated Feb. 22, 2021, issued by the Korean Intellectual Property Office in Korean Patent Application No. 10-2016-0122192.

* cited by examiner

310

510

ELECTRONIC APPARATUS AND CONTROLLING METHOD THEREOF

CROSS-REFERENCE TO RELATED APPLICATION

This application claims priority from Korean Patent Application No. 10-2016-0122192, filed on Sep. 23, 2016, in the Korean Intellectual Property Office, the disclosure of which is incorporated herein by reference in its entirety.

BACKGROUND

1. Field

Devices and methods consistent with exemplary embodiments relate to an electronic apparatus and a controlling method thereof, and more particularly, to an electronic apparatus which provides a content with category information selected by a user and a controlling method thereof.

2. Related Art

In recent years, as the number of available contents increases exponentially, there is a problem in that access to the available contents desired by a user becomes complicated.

Conventionally, in order to retrieve contents having category information preferred by a user, contents having the same category information have to be searched through a separate search window for searching contents.

Particularly, when a user does not know the category of a specific content, in order to search for the content having the same category information as the specific content, the user first searches the category information of the specific content, searches the content having the same category information again based on the retrieved category information, which causes inconvenience to the user.

SUMMARY

One or more exemplary embodiments relate to an electronic apparatus which is capable of checking the category information of a specific content and at the same time, searching and reproducing other contents having the same category information and a controlling method thereof.

According to an aspect of an exemplary embodiment, there is provided a method of controlling an electronic apparatus, the method including: displaying a content list including a plurality of display items corresponding to a plurality of contents; acquiring category information of a content corresponding to a first display item in response to sensing a first user interaction corresponding to a first display item from among the plurality of display items; displaying a plurality of category items representing the acquired category information around the first display item; and reproducing a content having category information corresponding to at least one of a plurality of selected category items in response to sensing a second user interaction of selecting at least the at least one of the plurality of category items.

The first user interaction may be a touch-and-hold interaction of a first touch corresponding to the first display item and maintaining the first touch for a predefined period of time, and the second user interaction may be a drag interaction of touching the first display item and dragging towards the at least one of the plurality of category items.

The acquiring may include acquiring and analyzing metadata of the first display item from an external server.

The displaying the plurality of items includes displaying the first display item differently from remaining display items of the plurality of display items, excluding the first display item.

The reproducing may include displaying a display item corresponding to a content having category information corresponding to the selected category item differently from other display items in response to the second user interaction.

The method may further include reproducing a content corresponding to the first display item in response to sensing a tap interaction corresponding to the first display item for less than the predefined period of time.

The content may be one from among a music content, a video content and a photo content.

The method may further include transmitting information regarding the selected category item to an external apparatus in response to sensing a third user interaction of selecting at least one among the plurality of category items and a drag interaction of dragging the item in a predefined direction.

The method may further include displaying a content list of an external apparatus in response to sensing a fourth user interaction of selecting a specific icon included in the content list, the content list including contents reproduced by the external apparatus.

According to an aspect of another exemplary embodiment, there is provided an electronic apparatus, including: a display configured to display a content list including a plurality of display items corresponding to a plurality of contents; an input interface configured to sense a user interaction; and a processor configured to control the display to display a content list including a plurality of display items corresponding to a plurality of contents, acquire category information corresponding to a first display item in response to the user input interface sensing a first user interaction selecting the first display item from among the plurality of display items, control the display to display a plurality of category items representing the acquired category information around the first display item, and reproduce a content having category information corresponding to at least one of a plurality of selected category items in response to the user input interface sensing a second user interaction selecting the at least one of the plurality of category items.

The first user interaction may be a touch-and-hold interaction of a first touch corresponding to the first display item and maintaining the first touch for a predefined period of time, and the second user interaction may be a drag interaction of touching the first display item and dragging towards the at least one of the plurality of category items.

The electronic apparatus may further include a communicator, and the processor may be further configured to acquire and analyze metadata of the first display item from an external server through the communicator.

The processor may be further configured to control the display to display the first display item differently from remaining display items of the plurality of display items, excluding the first display item.

The processor may be further configured to display a display item corresponding to a content having category information corresponding to the selected category item differently from other display items in response to the second user interaction.

The processor may be further configured to reproduce content corresponding to the first display item in response to the user input interface sensing a tap interaction corresponding to the first display item for less than the predefined period of time.

The content may be one from among a music content, a video content and a photo content.

The electronic apparatus may further include a communicator, and the processor may be further configured to control the communicator to transmit information regarding the selected category item to an external apparatus in response to the user input interface sensing a third user interaction of selecting at least one among the plurality of category items and a drag interaction of dragging the item in a predefined direction.

The processor may be further configured to control the display to display a content list of an external apparatus in response to the user input interface sensing a fourth user interaction of selecting a specific icon included in the content list, the content list including contents reproduced by the external apparatus.

According to an aspect of yet another exemplary embodiment, there is provided an electronic apparatus, including: a display; an input interface; and a processor configured to control the display to display a plurality of display items, detect a first input indicating one among the plurality of display items via the input interface, control the display to category information corresponding to the one among the plurality of display items, detect a second input indicating a first selected category via the input interface and determine a content based on the first selected category.

The processor may be further configured to detect a third input indicating the first selected category and a second selected category via the input interface, and determine the content based on the first selected category and the second selected category.

The electronic apparatus may further include a communicator, and the processor may be further configured to control the communicator to receive the plurality of display items from an external apparatus The processor may be further configured to control the display to display a plurality of icons respectively identifying a user of each of the plurality of display items.

According to an aspect of still another exemplary embodiment, there is provided a non-transitory computer readable recording medium having embodied thereon a program, which when executed by a processor of an electronic apparatus causes the electronic apparatus to execute a method, the method including: displaying a content list including a plurality of display items corresponding to a plurality of contents; acquiring category information of a content corresponding to a first display item in response to sensing a first user interaction corresponding to a first display item from among the plurality of display items; displaying a plurality of category items representing the acquired category information around the first display item; and reproducing a content having category information corresponding to at least one of a plurality of selected category items in response to sensing a second user interaction of selecting at least the at least one of the plurality of category items.

BRIEF DESCRIPTION OF THE DRAWINGS

The above and/or other aspects will be more apparent by describing certain exemplary embodiments with reference to the accompanying drawings, in which.

DETAILED DESCRIPTION OF EXEMPLARY EMBODIMENTS

Figure 1:
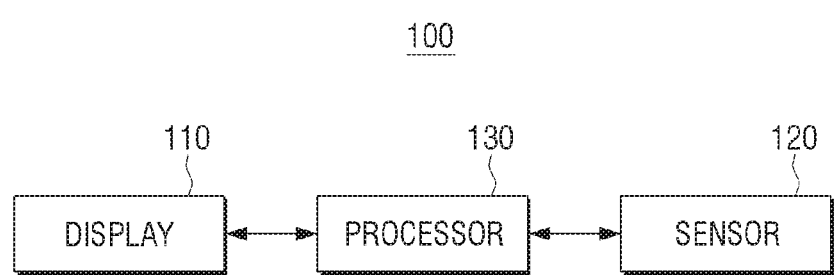
FIG. 1 is a block diagram illustrating configuration of an electronic apparatus briefly according to an exemplary embodiment.

Certain exemplary embodiments will now be described in greater detail with reference to the accompanying drawings.

The terms used in the example embodiments of the present disclosure may be general terms which are widely used now and selected considering the functions of the present disclosure. However, the terms may vary depending on the intention of a person skilled in the art, a precedent, or the advent of new technology. In addition, in a special case, terms selected by the applicant may be used. In this case, the meaning of the terms will be explained in detail in the corresponding detailed descriptions. Accordingly, the terms used herein should be defined based on the meanings of the terms and the overall contents of exemplary embodiments, rather than the simple names of the terms.

Aspects of exemplary embodiments will be exemplified in the drawings and described in detail in the description thereof. However, this is not intended to limit the scope of an exemplary embodiment, and it should be understood that all the modifications, equivalents or substitutes are encompassed. In describing the exemplary embodiments, well known technologies will not be described in detail to avoid obscuring the specification with unnecessary detail.

Terms, such as "first," "second," and so on may be used to describe a variety of elements, but the elements should not be limited by these terms. The terms are used only for the purpose of distinguishing one element from another.

A singular expression includes a plural expression, unless otherwise specified. The terms, "include", "comprise", "is configured to", etc., of the description are used to indicate that there are features, numbers, steps, operations, elements, parts or combination thereof, and they should not exclude the possibilities of combination or addition of one or more features, numbers, steps, operations, elements, parts or combination thereof.

According to exemplary embodiments, a "module" or "unit" performs at least one function or operation, and may be implemented as hardware or software, or a combination of hardware and software. In addition, a plurality of 'modules' or 'units' may be integrated into at least one module and may be realized as at least one process or processor.

It will be understood that, when an element is "connected" with another element, the element may be "directly connected" with another element, and also, the element may be "electrically connected" with another element with an intervening element therebetween. In addition, it will be understood that, when a certain part "includes" a certain element, the certain part may not exclude another element and may further include another element unless this term is defined otherwise. Expressions such as "at least one of" when preceding a list of elements, modify the entire list of elements and do not modify the individual elements of the list.

Hereinafter, exemplary embodiments will be described in greater detail with reference to the accompanying drawings, so that a person skilled in the art can easily implement the exemplary embodiments. However, exemplary embodiments may be realized in a variety of different configurations, and are not limited to descriptions provided herein. Further, similar drawing reference numerals are used for the similar elements throughout the description.

A user interaction is an action made by a user to control an electronic apparatus, and may include at least one of touch interaction, bending interaction, voice interaction, button interaction, and motion interaction, although not limited thereto. Further, the "user interaction" as used herein may refer to the same meaning as "user sensing" or "user manipulation".

According to an exemplary embodiment, the "touch interaction" may include touch gestures performed by a user to control an apparatus, and may be performed on a display or a cover. In addition, the "touch input" may include a touch gesture that does not contact the display, but is distanced away from the display by more than a predetermined distance (e.g., floating or hovering). The touch sensing may include, but is not limited to, a touch-and-hold gesture, a tap gesture of lightly touching and then releasing the touch, a double tap gesture, a panning gesture, a flick gesture, a touch-and-drag gesture of touching and then moving a touched point in one direction while maintaining the touch, a pinch gesture, etc.

FIG. 1 is a block diagram illustrating configuration of an electronic apparatus 100 according to an exemplary embodiment. As illustrated in FIG. 1, the electronic apparatus 100 includes a display 110, a sensor 120 and a processor 130. The electronic apparatus 100 according to an exemplary embodiment may be implemented as an audio apparatus provided with a display, but this is merely one of exemplary embodiments. The electronic apparatus 100 may be implemented as any one of a variety of electronic apparatuses such as smart phone, tablet PC, smart TV, and so on.

The display 110 outputs image data. In particular, the display 110 may display a content list including a plurality of display items corresponding to a plurality of contents.

The sensor 120 acquires information indicating a user interaction. In particular, the processor 130 may sense a user interaction which indicating a first display item from among a plurality of display items included in the content list through sensed information. In this case, the predefined user interaction may be a touch-and-hold interaction of touching the first display item and holding the touch for a predetermined time.

The processor 130 controls the overall operations of the electronic apparatus 100. In particular, if a predefined user interaction with respect to the first display item from among the plurality of display items is sensed, the processor 130 may acquire category information of a content corresponding to the first display item and control the display 110 to display a plurality of category items representing the acquired category information around the first display item. If a user interaction selecting at least one of the plurality of category items is sensed, the processor 130 may reproduce a content having the category information corresponding to the selected category item.

The processor 130 may control the display to display a content list including a plurality of display items corresponding to each of the plurality of contents.

The processor 130 may sense a predefined user interaction (e.g., a touch-and-hold interaction) corresponding to the first display item from among the plurality of display items through the sensor 120. In this case, the predefined user interaction may be a touch-and-hold interaction of touching the first display item and holding the touch for a predetermined time.

The processor 130 may acquire category information regarding the first display item in which the predefined user interaction is sensed. In this case, the processor 130 may acquire category information by analyzing metadata of the content corresponding to the first display item or receive category information of the content corresponding to the first display item from an external server.

Here, the category information refers to information representing a content, and e.g., if the content is a music content, the category information may include information regarding singer, genre, musical composer, lyricist, producer, era, album, etc.

Once the category information is acquired, the processor 130 may control the display 110 to display a category item representing the category information around the display item. For example, the processor 130 may control the display 110 to display a category item on one of up, down, left, and right sides of the display item.

In this case, the processor 130 may control the display 110 to display the first display item around which the category item is displayed differently from the remaining display items.

While the category item is displayed around the first display item, the processor 130 may sense a user interaction selecting at least one of the plurality of category items through the sensor 120. For example, the processor 130 may sense a drag interaction of dragging at least one of the plurality of category items while the first display item is touched while category items are displayed around the first display item.

The processor 130 may search and reproduce a content having category information corresponding to a selected category item. In this case, the processor 130 may reproduce a content having category information corresponding to a selected category item immediately and add the content to a play list.

In addition, if a user interaction selecting at least one of the plurality of category items is sensed, the processor 130 may control the display 110 to display the display item corresponding to the content having the category information corresponding to the selected category item differently from other display items. In other words, the display item having the category information selected by a user may be displayed distinctively from other display items.

If a tap interaction corresponding to the first display item is released within the predetermined time is sensed, the processor 130 may reproduce the content corresponding to the first display item.

In addition, if the electronic apparatus 100 is communicably connected to an external apparatus, when a user interaction selecting at least one of the plurality of category items is sensed and then, a drag interaction of dragging the selected item in a predefined direction (e.g., upper direction), the processor 130 may control information regarding a content having the category information corresponding to the selected category item to the external apparatus connected to be transmitted to the electronic apparatus.

In addition, if a user interaction selecting a specific icon included in the content list is sensed, the processor 130 may control the display 110 to display a content list of the external apparatus including contents which are reproduced by the external apparatus.

Hereinafter, exemplary embodiments will be described in greater detail with reference to FIGS. 2, 3A, 3B, 3C, 3D, 4, 5A, 5B, 5C, 6, 7A, 7B, 7C, 7D, 8A, 8B, 8C and 8D.

Figure 2:
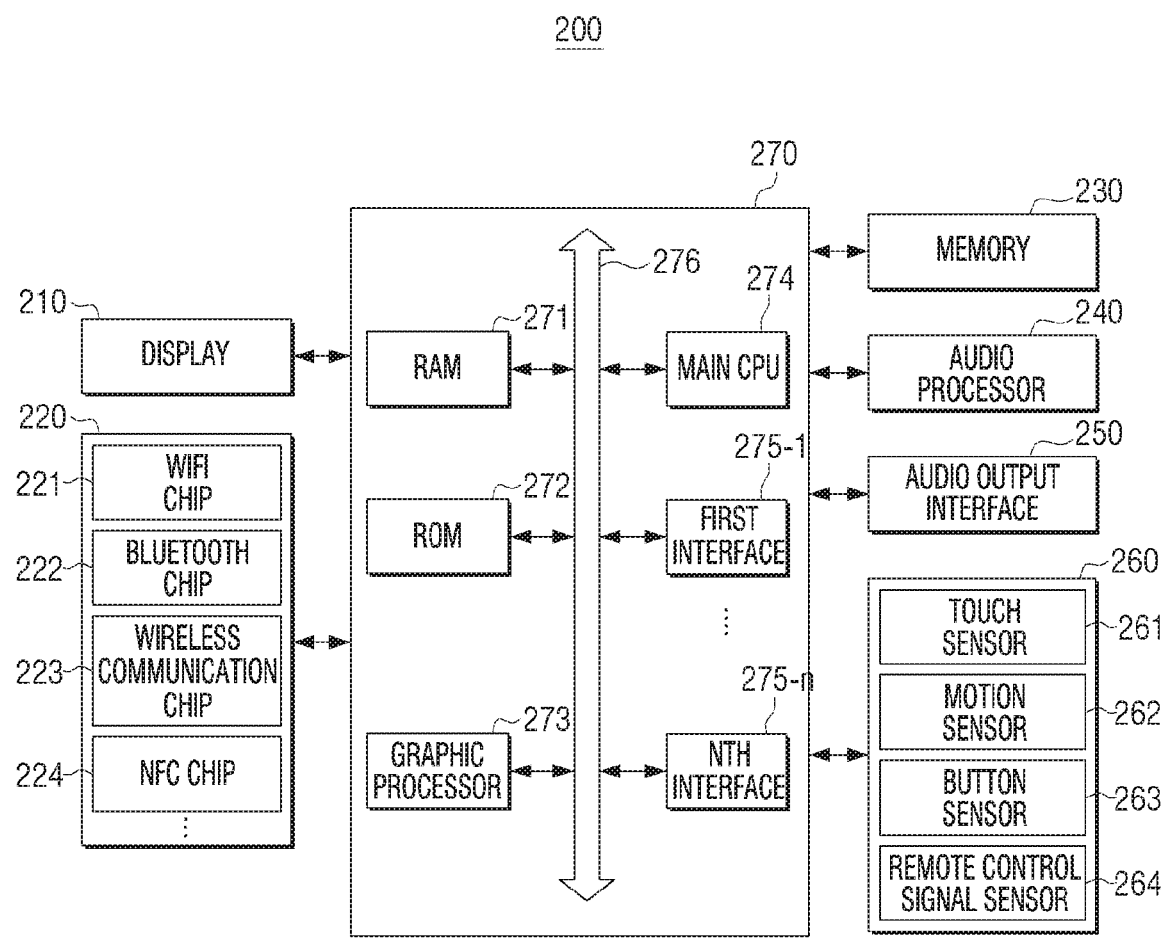
FIG. 2 is a block diagram illustrating configuration of an electronic apparatus in detail according to an exemplary embodiment.

FIG. 2 is a block diagram illustrating configuration of an electronic apparatus 200 according to an exemplary embodiment.

As illustrated in FIG. 2, the electronic apparatus 200 may include a display 210, a communicator 220, a memory 230, an audio processor 240, an audio output interface 250, a sensor 260, and a processor 270. The elements of the electronic apparatus 200 illustrated in FIG. 2 are exemplary, and exemplary embodiments are not limited thereto. Thus, the elements of the electronic apparatus 200 illustrated in FIG. 2 may be partly omitted or modified, and additional elements may be included according to the type or purpose of the electronic apparatus 200.

The display 210 may display various screens or user interfaces (UIs) on a display area. In particular, the display 210 may display a content list including a plurality of display items corresponding to a plurality of contents. In addition, the display 210 may display a category item around the plurality of display items.

The display 210 may have various sizes. For example, the display 210 may have sizes of 3 inches, 4 inches, 4.65 inches, 5 inches, 6.5 inches, 8.4 inches, and so on. The display 210 may be configured with a plurality of pixels, and the resolution may be represented by the number of pixels in the horizontal direction multiplied by the number of pixels in the vertical direction. For example, the display 210 may have 320×320 resolution, 360×480 resolution, 720×1280 resolution, 1280×800 resolution, 3940×2160 resolution, and so on.

The display 210 may be implemented as a display panel of various shapes. For example, the display panel may be implemented with various display technologies such as liquid crystal display (LCD), organic light emitting diode (OLED), active-matrix organic light-emitting diode (AMOLED), liquid crystal on silicon (LcoS), or digital light processing (DLP). The display 210 may be implemented in the form of a flexible display and may be connected to at least one of a front area, a side area, and a rear area of the electronic apparatus 200.

The display 210 may be combined with the touch sensor 211 to implement a touch screen in a layer structure. The touch screen may have not only a display function, but also a function to detect a touch input position, a touched area, and also a touch input pressure. Further, the touch screen may have a function to detect a proximity touch as well as a real touch.

The communicator 220 is an element to communicate with various types of external devices according to various types of communication methods. The communicator 220 may include at least one of a WiFi chip 221, a Bluetooth chip 222, a wireless communication chip 223, and a near field communication (NFC) chip 224. The processor 270 may communicate with an external server or various types of external devices by using the communicator 220.

In particular, the WiFi chip 221 and the Bluetooth chip 222 may communicate according to WiFi and Bluetooth schemes, respectively. When using the WiFi chip 221 or the Bluetooth chip 222, various connecting information such as service set identifier (SSID), session key, and so on may be first transmitted and received, so that connection for communication may be established by using the same for the transmission and reception of various data. The wireless communication chip 223 refers to a chip that performs communication according to the various communication standards such as IEEE, Zigbee, 3rd Generation (3G), 3rd Generation Partnership Project (3GPP), Long Term Evolution (LTE), and so on. The NFC chip 224 may refer to a chip that operates in a NFC manner using a frequency band of 13.56 MHz among various radio-frequency identification (RFID) frequency bands such as 135 kHz, 13.56 MHz, 433 MHz, 860 to 960 MHz, and 2.45 GHz.

In particular, the communicator 220 may receive category information of a music content which is currently streamed from an external server. In addition, the communicator 220 may receive information regarding a content including category information corresponding to a category item selected by a user.

The memory 230 may store various programs and data necessary for the operation of the electronic apparatus 200. The memory 230 may be implemented as a non-volatile memory, a volatile memory, a flash memory, a hard disk drive (HDD) or a solid state drive (SSD). The memory 230 may be accessed by the processor 270, and the processor 270 may perform reading/recording/revising/deleting/renewing of the data. According to an exemplary embodiment, the term "memory" as used herein may include a memory 230, a read-only memory (ROM) 272, and a random-access memory (RAM) 271 within the processor 270, or a memory card mounted on the electronic apparatus 200 (e.g., micro Secure Digital (SD) card, memory stick). Further, the memory 230 may include a buffer which temporarily stores various data of music contents.

Also, the memory 230 may store a program, data, and the like for types of screens that will be displayed in the display area of the display 210.

In particular, the memory 230 may store metadata regarding a content which is currently reproduced.

The audio processor 240 is an element that processes audio data of image contents. The audio processor 240 may perform various processing of the audio data, such as decoding and amplifying, noise filtering, and so on. The audio data processed by the audio processor 240 may be output to the audio output interface 250.

The audio output interface 250 is configured to output various alarm sounds or voice messages as well as various audio data processed through various processing such as decoding, amplifying, and noise filtering at the audio processor 240. Specifically, the audio output interface 250 may be implemented as a speaker, but this is merely one of various exemplary embodiments of the present disclosure. The audio output interface 250 may be implemented as an output terminal that can output audio data.

The sensor 260 senses various user inputs. Further, the sensor 260 may detect various changes such as position change, illuminance change, acceleration change, and so on, of the electronic apparatus 200, and deliver the corresponding electrical signal to the processor 270. Thus, the sensor 260 may sense state change generated based on the electronic apparatus 200, generate a sensing signal accordingly, and deliver the same to the processor 270.

According to an exemplary embodiment, the sensor 260 may include various sensors, and when the electronic apparatus 200 is driven (or based on user setting), at least one sensor which is set under the control of the sensor 260 may be supplied with power to sense the state change of the electronic apparatus 200. In this case, the sensor 260 may consist of various sensors, and may be configured to detect the state change of the electronic apparatus 200. For example, the sensor 260 may include at least one sensor among a variety of sensing devices such as touch sensor, acceleration sensor, gyro sensor, illuminance sensor, proximity sensor, pressure sensor, noise sensor (e.g., microphone), video sensor (e.g., camera module), pen recognition sensor, timer, and so on.

The sensor 260 may include, but is not limited to, a touch sensor 261, the motion sensor 262, a button sensor 263, a remote control signal sensor 264, etc., according to various purposes.

There is no physical restriction to a type of a sensor included in the sensor 260, and one or more sensors may be combined to serve as the sensors 261 to 264. Further, according to the implementation methods, the configuration or the function of the sensor 260 may be partly included in the processor 270.

The touch sensor 261 may sense a user's finger input, and output a touch event value corresponding to the sensed touch signal.

In this case, the processor 270 may partially perform the functions of the touch sensor 261. For example, the touch sensor 261 may transmit to the processor 270 the signal value acquired from the touch sensor or the user input information calculated from the signal value. Using the received signal value or the user input information, the processor 270 may determine the type of the touch input by using the touch recognition algorithms, the touch pattern data, etc., stored in the memory 230.

The motion sensor 262 may sense the movement of the electronic apparatus 200 (e.g., rotation, tilting, and so on) by using at least one of the acceleration sensor, the tilt sensor, the gyro sensor, and the 3-axis magnetic sensor. Further, the motion sensor 262 may deliver a generated electrical signal to the processor 270. For example, the motion sensor 262 may measure the acceleration in which the motion acceleration and gravity acceleration of the electronic apparatus 200 is added. However, when there is no movement of the electronic apparatus 200, only the gravity acceleration may be measured.

The button sensor 263 may sense the user interaction of selecting a button provided on the electronic apparatus 200. Further, the remote control signal sensor 264 may sense a signal corresponding to the button selected by a user among the buttons provided on the external remote controller.

Besides, the sensor 260 may additionally include a pen sensor (e.g., pen recognition panel).

A microphone may receive a user voice (e.g., 'start photographing', 'stop photographing', 'finish photographing', or the like) for controlling a medical device using the electronic apparatus 200, and recognize a user voice through a voice recognition module. Further, the recognition results may be transmitted to the processor 270. In this case, rather than being in the microphone, the voice recognition module may be part of the processor 270 or positioned outside the electronic apparatus 200.

The processor 270 may control the overall operation of the electronic apparatus 200 by using various programs stored in the memory 230.

The processor 270 may include the RAM 271, the ROM 272, a graphic processor 273, a main central processing unit (CPU) 274, first through nth interfaces 275-1 through 275-n, and a bus 276. In this case, the RAM 271, the ROM 272, the graphic processor 273, the main CPU 274, and the first to nth interfaces 275-1 to 275-n may be interconnected through the bus 276.

The RAM 271 stores operating system (O/S) and application programs. Specifically, as the electronic apparatus 200 is booted, O/S may be stored in the RAM 271 and various application data selected by a user may be stored in the RAM 271.

The ROM 272 stores a set of commands for system booting. When a turn-on command is input and thus the power is supplied, the main CPU 274 may copy the O/S stored in the memory 230 to the RAM 271 according to the commands stored in the ROM 272, and boot the system by executing the O/S. When the booting is completed, the main CPU 274 may copy various application programs stored in the memory 230 to the RAM 271, and perform various operations by executing the application programs copied to the RAM 271.

The graphic processor 273 may generate screens including various objects such as items, images, texts, and so on, by using an operator and a renderer. In this case, the operator may be configured to calculate attribute values such as coordinates, shape, size, color, and so on for each object to be displayed according to the layout of the screen, by using the controlling commands received from the sensor 260. Further, the renderer may be configured to generate various layouts of screens including objects based on the attribute values calculated at the operator. The screen generated by the renderer may be displayed in a display area of the display 210.

The main CPU 274 may access the memory 230 and perform booting by using the O/S stored in the memory 230. Further, the main CPU 274 may perform various operations by using various programs, contents, data, and so on stored in the memory 230.

The first to nth interfaces 275-1 to 275-n are connected to the aforementioned various components. One of the first to nth interfaces 275-1 to 275-n may be a network interface connected to an external apparatus through a network.

The processor 270 may control the display 210 to display a content list including a plurality of display items corresponding to a plurality of contents. In this case, the processor 270 may control the display 210 to display a music content list including a plurality of display items corresponding to a plurality of music contents as illustrated in FIG. 3A.

The processor 270 may control the audio output interface 250 to reproduce music contents included in the content list while the content list is displayed. The content list may include a plurality of display items.

Figure 3A:
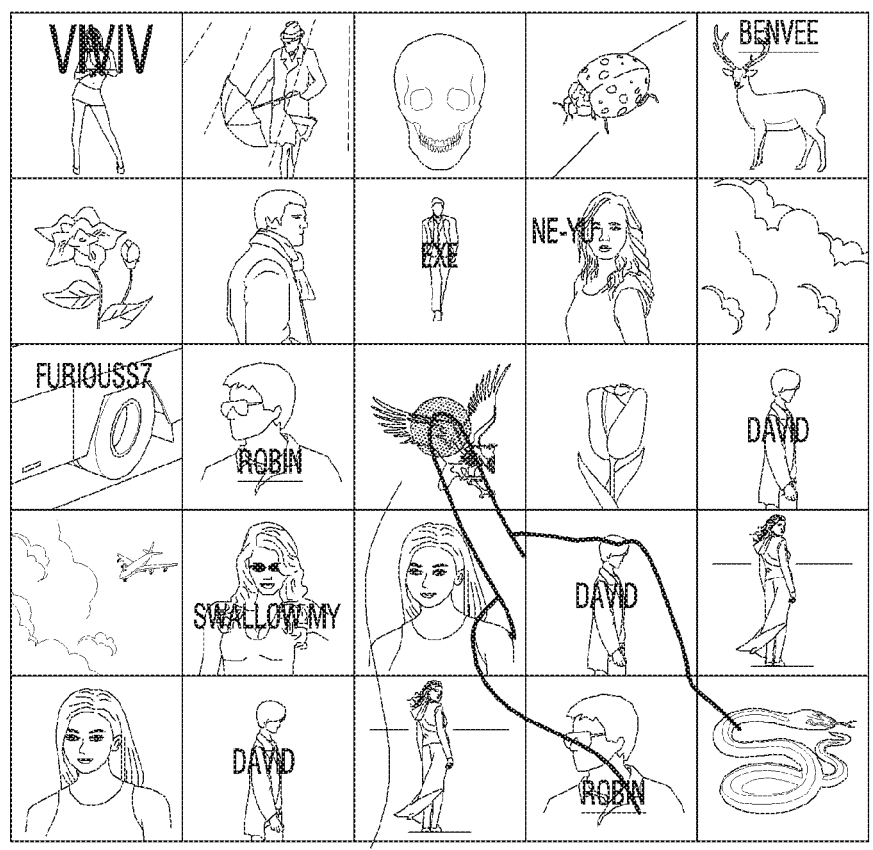
FIGS. 3A, 3B, 3C, 3D, 4, 5A, 5B and 5C are views provided to explain a method for reproducing a content having the same category information as a content selected by a user according to various exemplary embodiments.

In this case, as illustrated in FIG. 3A, the display items may include thumbnail images of the corresponding music contents, but this is only an example. The display items may include information regarding title, singer, reproduction time, etc., of the corresponding music contents.

Here, FIG. 3A illustrates that 25 display items are included in the content list, but this is only an example. Other numbers of display items may be included. The number of display items included in the content list may be changed according to the distance between the electronic apparatus 200 and a user. For example, the greater the distance between the user and the electronic apparatus 200, the greater the number of display items, and the shorter the distance between the user and the electronic apparatus 200, the smaller the number of display items.

As illustrated in FIG. 3A, the processor 270 may sense a predefined user interaction with respect to a first display item 310 from among a plurality of display items through the sensor 260. In this case, the predefined user interaction may be a touch-and-hold interaction of touching the first display item and holding the touch for a predefined time, but this is only an example. The predefined user interaction may include various interactions such as a double-tap interaction of performing a plurality of taps within a predetermined time.

If a predefined user interaction is sensed in the first display item 310, the processor 270 may acquire category information regarding the first display item 310. Here, the category information regarding music contents may include information regarding singer, genre, composer, lyricist, producer, era, album, etc.

Specifically, if the music content included in the music content list is a music content stored in a memory, the processor 270 may acquire category information based on metadata of the stored music content. Alternatively, if the music content included in the music content list is a music content streamed from an external server, the processor 270 may acquire category information by controlling the communicator 220 to receive metadata regarding the music content from the external server. If the music content is a music content stored in a storage medium which is reproduced from an external reproduction apparatus, the processor 270 may acquire category information using metadata stored in the storage medium.

Figure 3B:
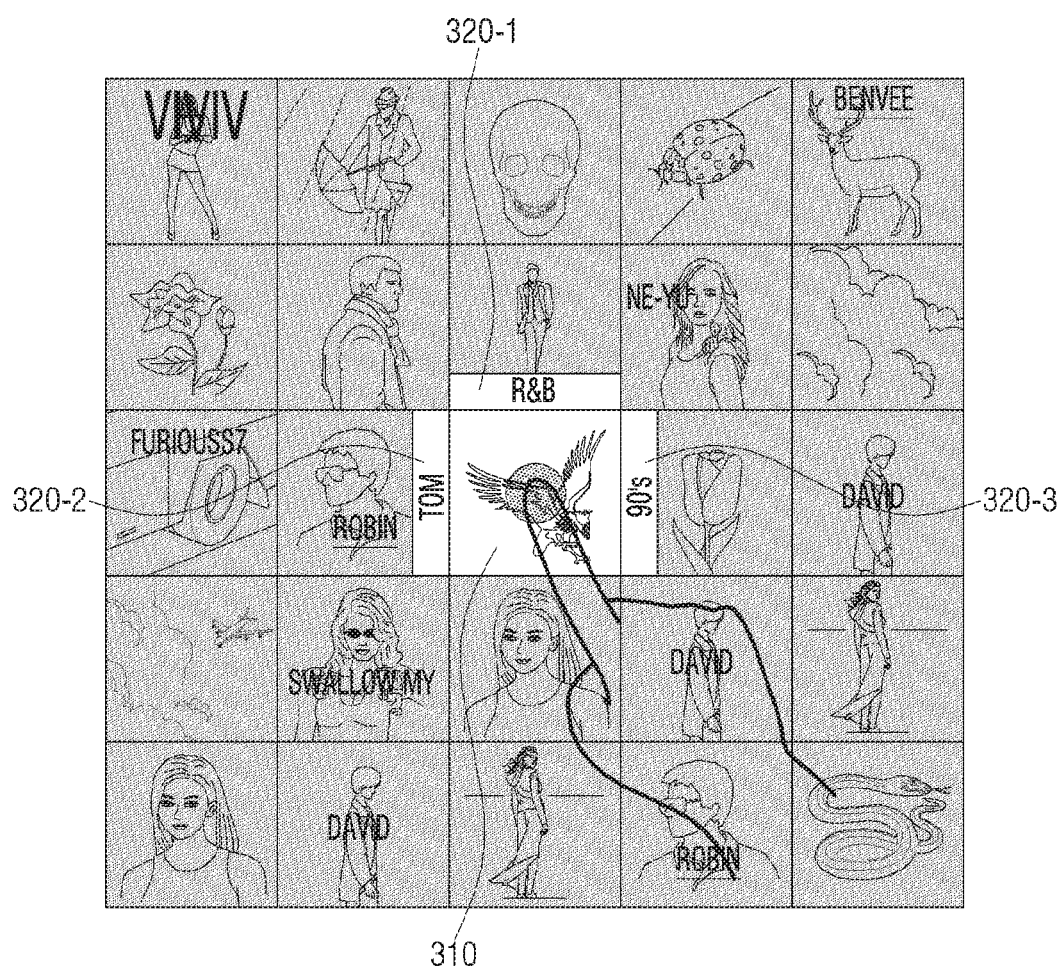

Once the category information is acquired, the processor 270 may control the display 210 to display the category item representing the category information around the first display item 310. Specifically, as illustrated in FIG. 3B, the processor 270 may control the display 210 to display first to third category items 320-1 to 320-3 which represent the genre information, singer information and era information of the corresponding music content, respectively, around the first display item 310. For example, as illustrated in FIG. 3B, the processor 370 may control the display 210 to display the first category item 320-1 representing "R&B" as the genre information of the music item corresponding to the first display item 310, to display the second category item representing "TOM" as the singer information of the music content corresponding to the first display item 310, and to display the third category item 320-3 representing "90's" as the era information of the music content corresponding to the first display item 310.

The type of category item which is displayed around a display item may vary according to a user setting. For example, in FIG. 3B, genre information, singer information and era information is displayed, but other various information such as composer information, tempo information, producer information, album information, etc., may be displayed according to a user setting.

In this case, the processor 270 may control the display 210 to display the first display item 310 for which predefined user interaction is sensed distinctively from other display items. For example, as illustrated in FIG. 3B, the processor 270 may control the display 210 such that the first display item 310 is displayed brighter than the other display items.

If at least one category item is selected while category items 320-1 to 320-3 are displayed around the first display item 310, the processor 270 may search and reproduce a content having the category information which represents the selected category item.

Figure 3C:
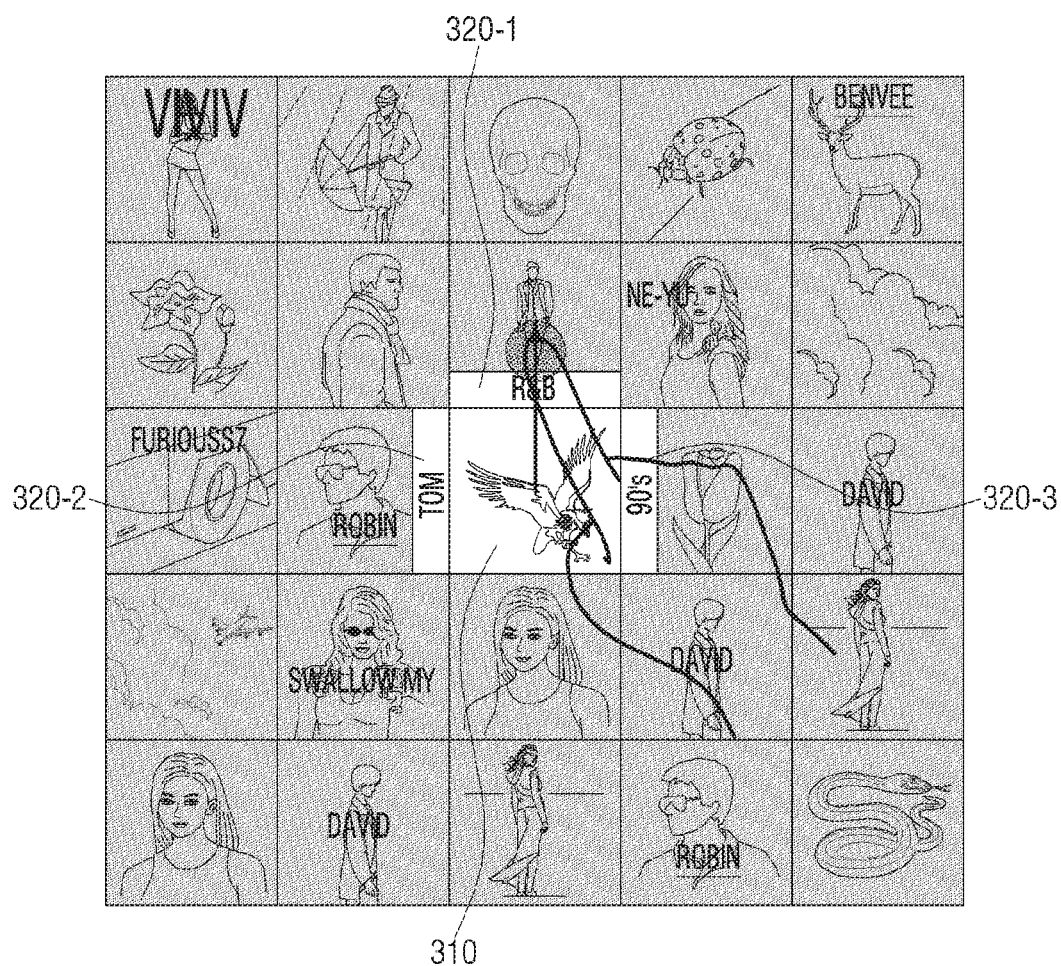

Specifically, as illustrated in FIG. 3C, if a drag interaction is sensed in the direction of the first category item 320-1 from among the plurality of category items with the first display item 310 being touched while the plurality of category items 320-1 to 320-3 are displayed around the first display item 310, the processor 270 may search for a sound content in the R&B genre corresponding to the first category item 320-1 for which the drag interaction is sensed. In this case, the processor 270 may search for a music content in the R&B genre included in the current music content list, but this is only an example. The processor 270 may receive recommendations on a music content in the R&B genre from an external server, and search a music content in the R&B genre stored in the electronic apparatus 200.

Figure 3D:
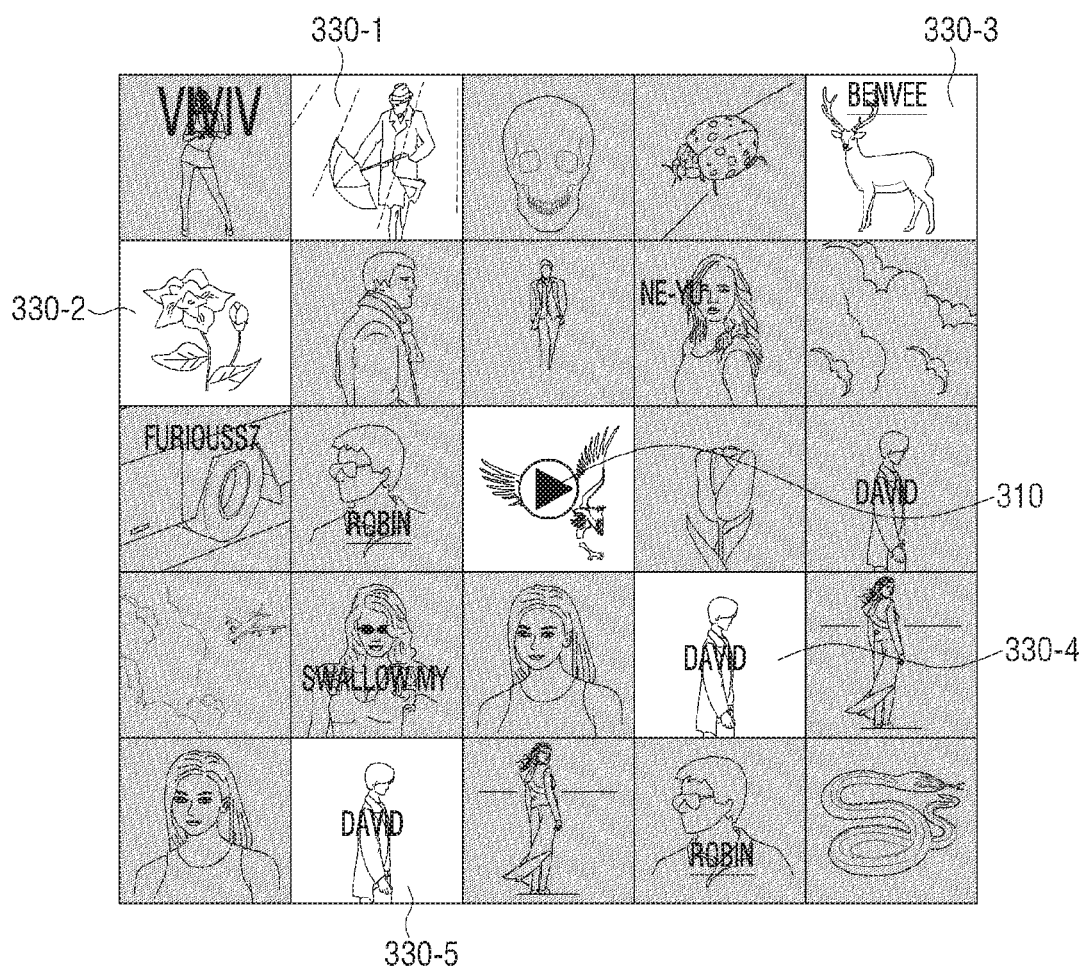

If a music content in the R&B genre included in the current music content list is retrieved, as illustrated in FIG. 3D, the processor 270 may control the display 210 to display second display items 330-1 to 330-5 corresponding to the retrieved music content distinctively from other display items.

According to an exemplary embodiment, the processor 270 may reproduce music contents having selected category information immediately, but this is only an example. The processor 270 may control the display 210 to display a menu on the screen of FIG. 3D in order to perform a function regarding the music contents having the selected category information. In this case, the menu may include an item for reproduction, an item for adding a reproduction list, an item for storage, an item for deletion, etc. The processor 270 may control the audio output interface 250 to reproduce a music content having the selected category information (R&B genre) according to a user command (e.g., a user command to select an item for reproduction). The processor 270 may include a music content having the selected category information in a separate reproduction list according to a user command (e.g., a user command to select an item for adding a reproduction list). The processor 270 may select a music content having the selected category information and delete the music content from the music content list according to a user command (e.g., a user command to delete an item).

In other words, a user may select a plurality of desired contents without touching a display item from a touch-and-hold interaction to a drag interaction.

If a general tap interaction which is not a predefined user interaction is sensed on the first display item 310, the processor 270 may control the audio output interface to reproduce a content corresponding to the first display item 310 immediately.

Figure 4:
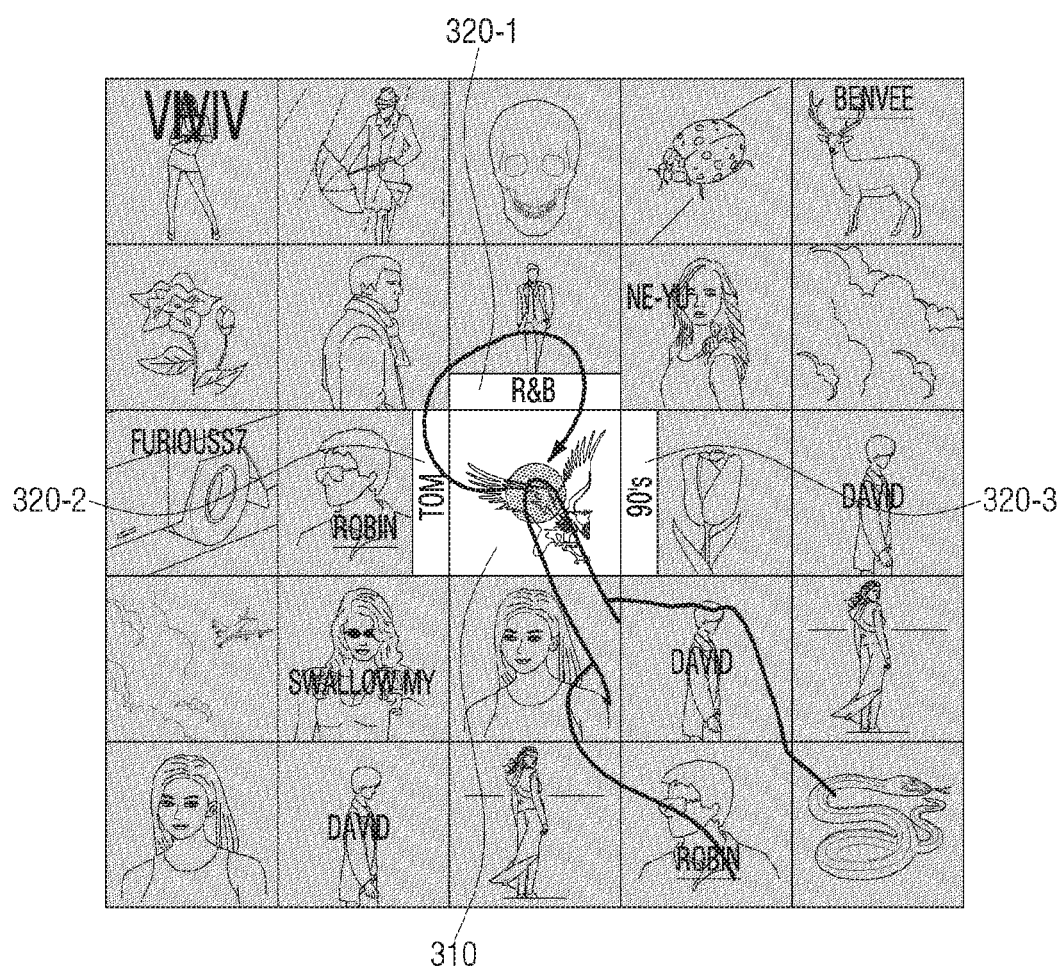

FIG. 3C illustrates a drag interaction selecting one category information, this is only an example. A drag interaction selecting a plurality of category information may be sensed. For example, as illustrated in FIG. 4, a drag interaction in a clockwise direction to select the second category item 320-2 and the first category item 320-1 may be sensed. In this case, a music content may be searched by placing priority on category information corresponding to the category item which is selected first.

In FIGS. 3C and 4, a drag interaction is sensed to select a category item, but this is only an example. Other user interaction such as a double-tap interaction may be sensed to select other user interaction.

In addition, FIGS. 3A, 3B, 3C, 3D and 4 illustrate a music content list including music contents, but this is only an example. A music content list may comprise various contents such as photo contents, video contents, movie contents, etc., in addition to music contents.

Hereinafter, a photo content list will be described with reference to FIGS. 5A, 5B and 5C.

Figure 5A:
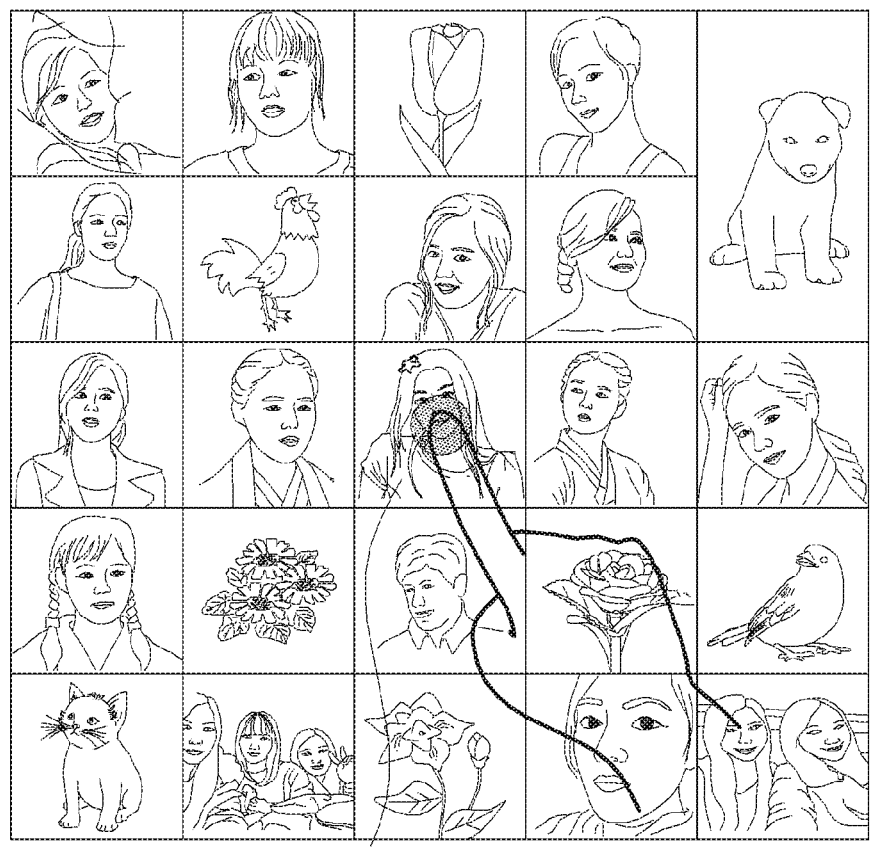

As illustrated in FIG. 5A, the processor 270 may control the display 210 to display a photo content list including a plurality of display items corresponding to a plurality of photo contents.

In this case, as illustrated in FIG. 5A, the display items may include thumbnail images of the corresponding photo contents, but this is only an example. The display items may include information regarding the file name of the corresponding photo content, etc.

As illustrated in FIG. 5A, the processor 270 may sense a predefined user interaction with respect to a first display item 510 from among a plurality of display items through the sensor 260. If a predefined user interaction is sensed in the first display item 510, the processor 270 may acquire category information regarding the first display item 310. In this case, the category information of the photo content may include color information, storage source information, photographing location information, photographing time information, folder information, etc.

Once the category information is acquired, the processor 270 may control the display 210 to display the category item representing the category information around the first display item 510. Specifically, as illustrated in FIG. 5B, the processor 270 may control the display 210 to display first to third category items 520-1 to 520-3 which represent the photographing location information, color information and storage source information, respectively, of the music content corresponding to the first display item 310 around the first display item 310. For example, as illustrated in FIG. 5B, the processor 370 may control the display 210 to display the first category item 520-1 representing "Seoul" as the photographing location information of the photo content corresponding to the first display item 510, to display the second category item 520-2 representing "RED" as the color information of the photo content corresponding to the first display item 510, and to display the third category item 520-3 representing "Jiyeon" as the storage location information of the photo content corresponding to the first display item 510.

When at least one category item is selected while the plurality of category items 520-1 to 520-3 are displayed around the first display item 510, the processor 270 may search a content having the category information of the selected category item.

Figure 5B:
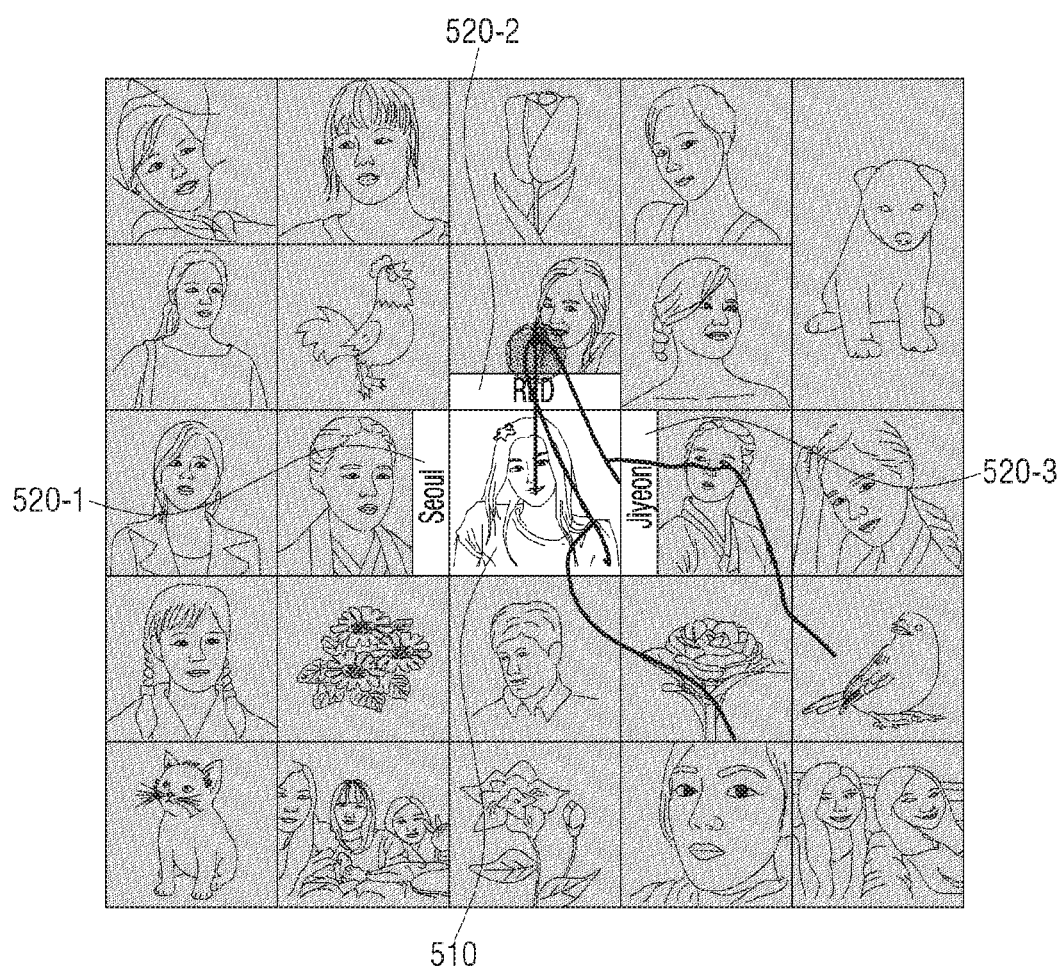
Figure 5C:
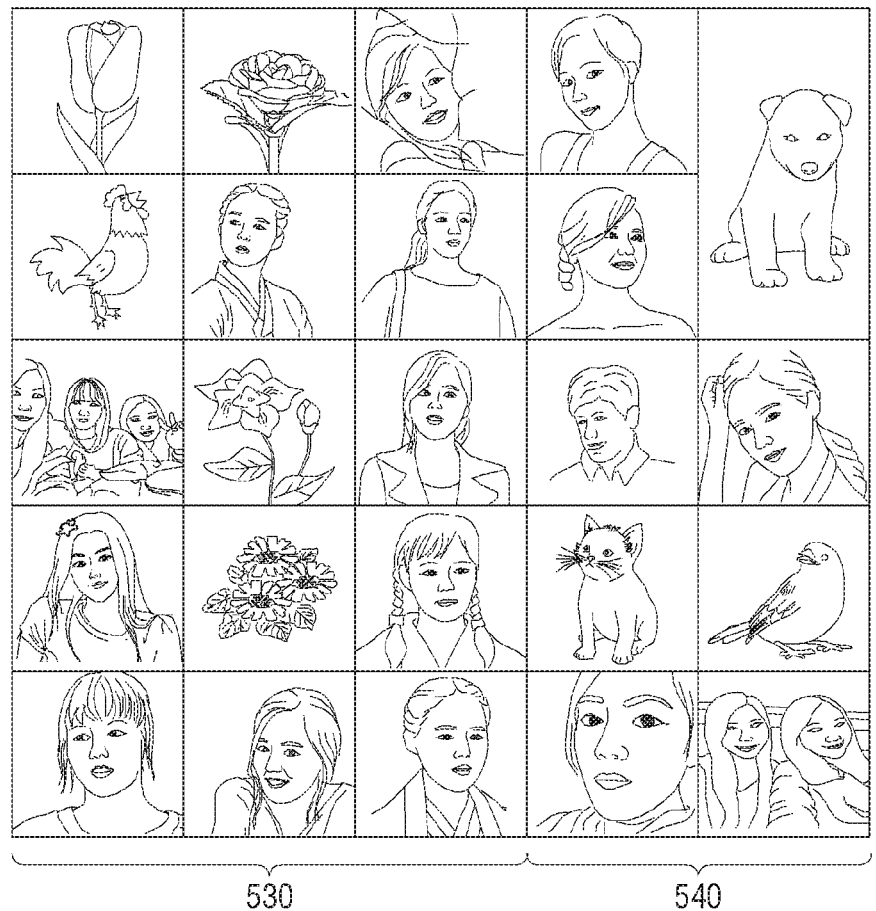

Specifically, as illustrated in FIG. 5B, if a drag interaction is sensed in the direction of the second category item 520-2 from among the plurality of category items with the first display item 510 being touched while the plurality of category items 520-1 to 520-3 are displayed around the first display item 510, the processor 270 may search a photo content in red corresponding to the second category item 520-2 for which the drag interaction is sensed.

The processor 270 may control the display 210 to display the searched photo contents in red on the first area 530 and to display the remaining contents on the second area 540.

The processor 270 may reproduce the photo contents displayed on the first area 530, store the photo contents, or delete the photo contents according to a user command.

As another example, the technical concept of an exemplary embodiment may also be applied when a content is a video content or an image content. For example, if a content is a video content, the category information of the video content may include producer information, performer information, image-quality information, etc. If a content is a movie content, the category information of the movie content may include performer information, genre information, director information, etc.

FIGS. 6, 7A, 7B, 7C, 7D, 8A, 8B, 8C and 8D are views provided to explain an exemplary embodiment for controlling an external apparatus by being connected to the external apparatus according to another exemplary embodiment.

Figure 6:
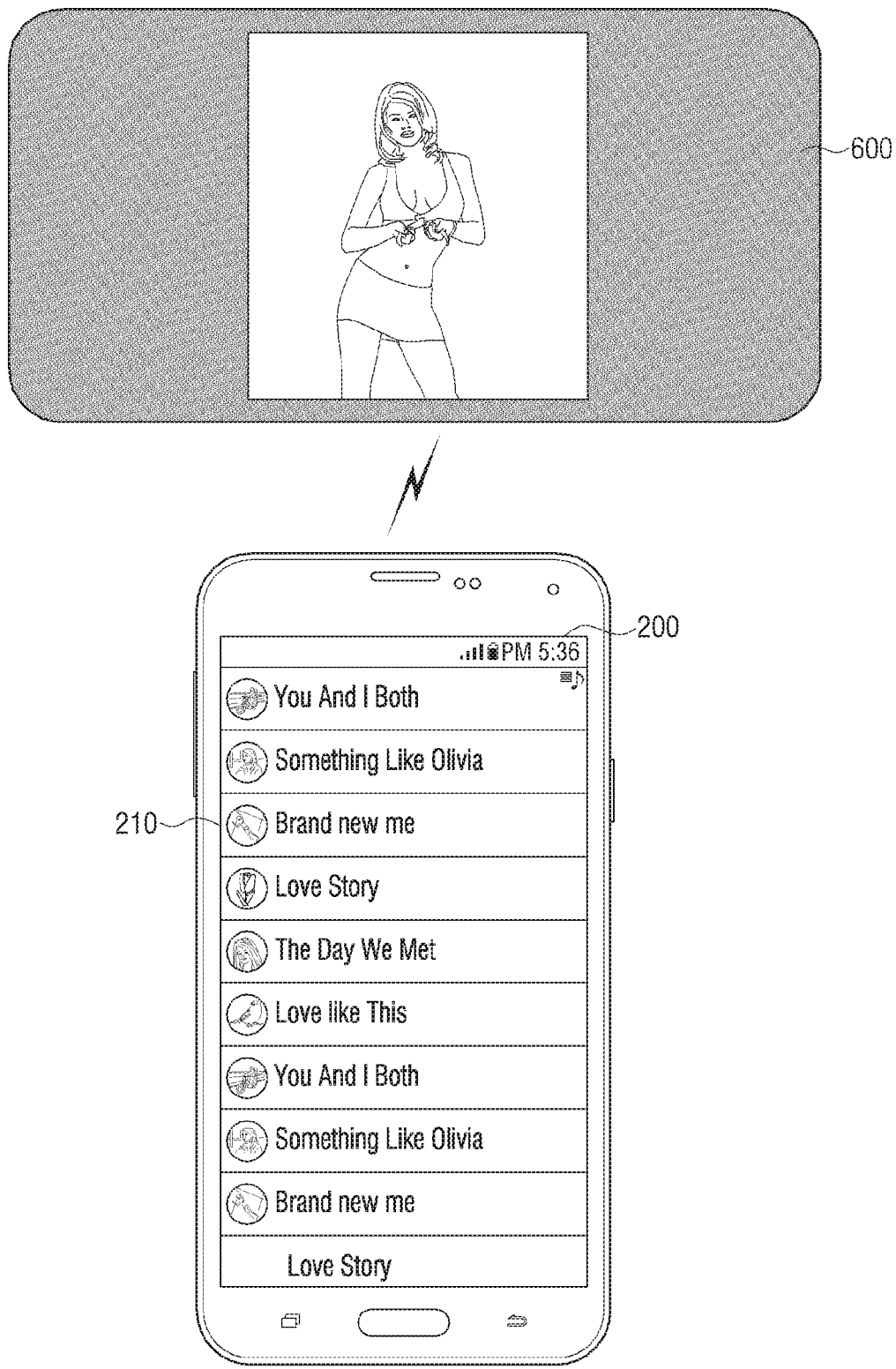
FIGS. 6, 7A, 7B, 7C, 7D, 8A, 8B, 8C and 8D are views provided to explain an exemplary embodiment for controlling an external apparatus connected to an electronic apparatus according to various exemplary embodiments.

As illustrated in FIG. 6, a content reproduction system includes the electronic apparatus 200 and an external apparatus 600. In this case, as illustrated in FIG. 6, the electronic apparatus 200 may be a smart phone, but this is only an example. The electronic apparatus 200 is a terminal device capable of controlling the external apparatus 600, such as a remote controller, a tablet PC, etc., and the external apparatus 600 may be a speaker, etc. The external apparatus 600 may be implemented as an audio output apparatus such as a sound bar, a digital TV, etc. Here, the electronic apparatus 200 may control the external apparatus 600 by being connected to the external apparatus for communication.

In FIG. 6, there is only one electronic apparatus 200 connected to the external apparatus 600, but a plurality of electronic apparatuses may be connected to the external apparatus 600.

In addition, as illustrated in FIG. 6, the electronic apparatus 200 may include a content list for selecting a content to be reproduced in the external apparatus 600.

Figure 7A:
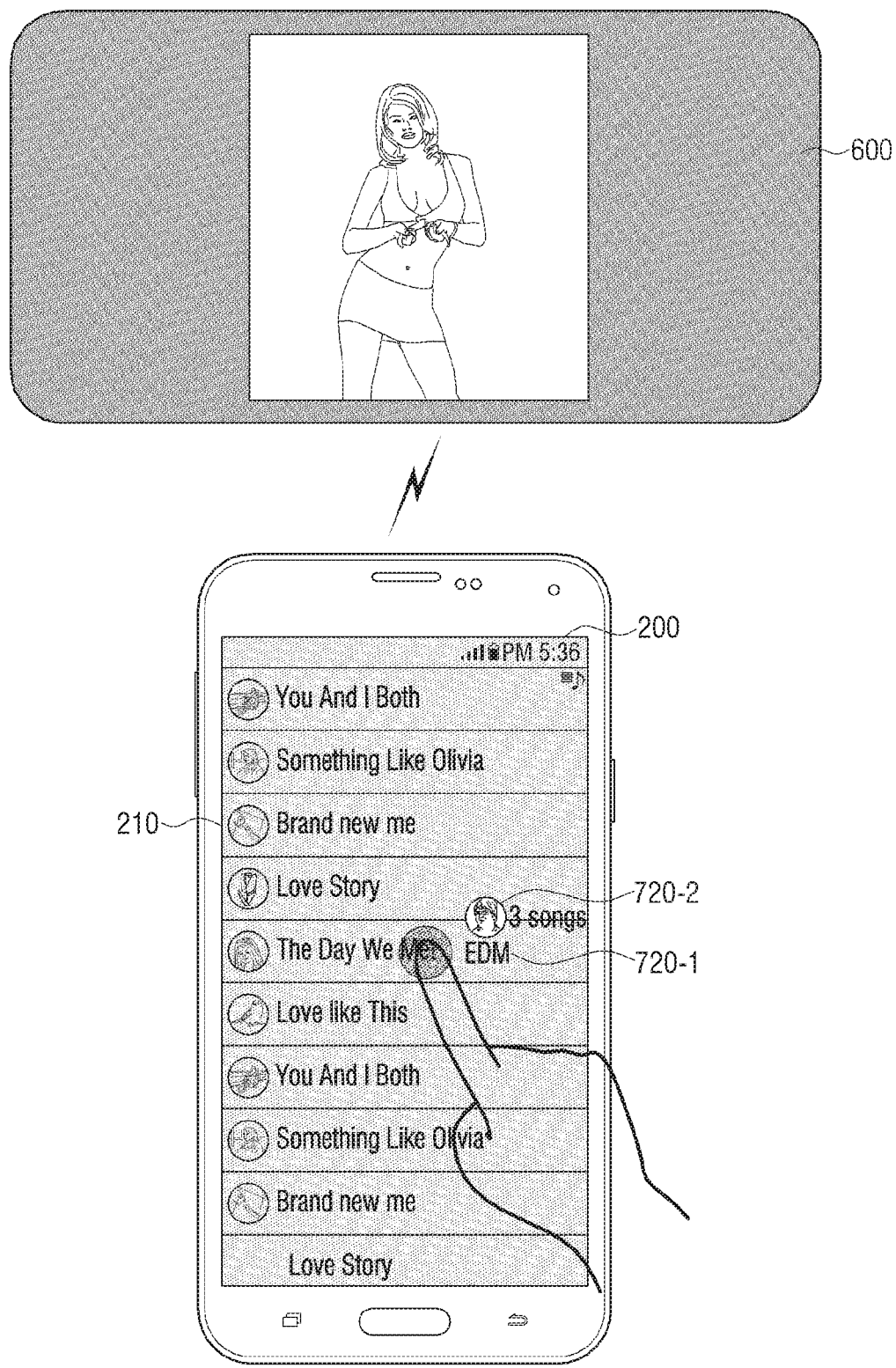

If a user action predefined in the first display item 710 is sensed while a content list is displayed, as illustrated in FIG. 7A, the processor 270 may control the display 210 to display the first category item 720-1 and the second category item 720-2 representing category information regarding the first display item 710 around the first display item 710. Here, the first category item 720-1 is an item representing the singer information of a content corresponding to the display item for which the predefined user interaction is sensed, and may include a singer image, not a text. In addition, the first category item 720-1 may include an icon indicating the number of display items (e.g., three) having the same singer information.

As illustrated in FIG. 7A, the processor 270 may control the display 210 to blur the display items while the first category item 720-1 and the second category item 720-2 are displayed.

Figure 7B:
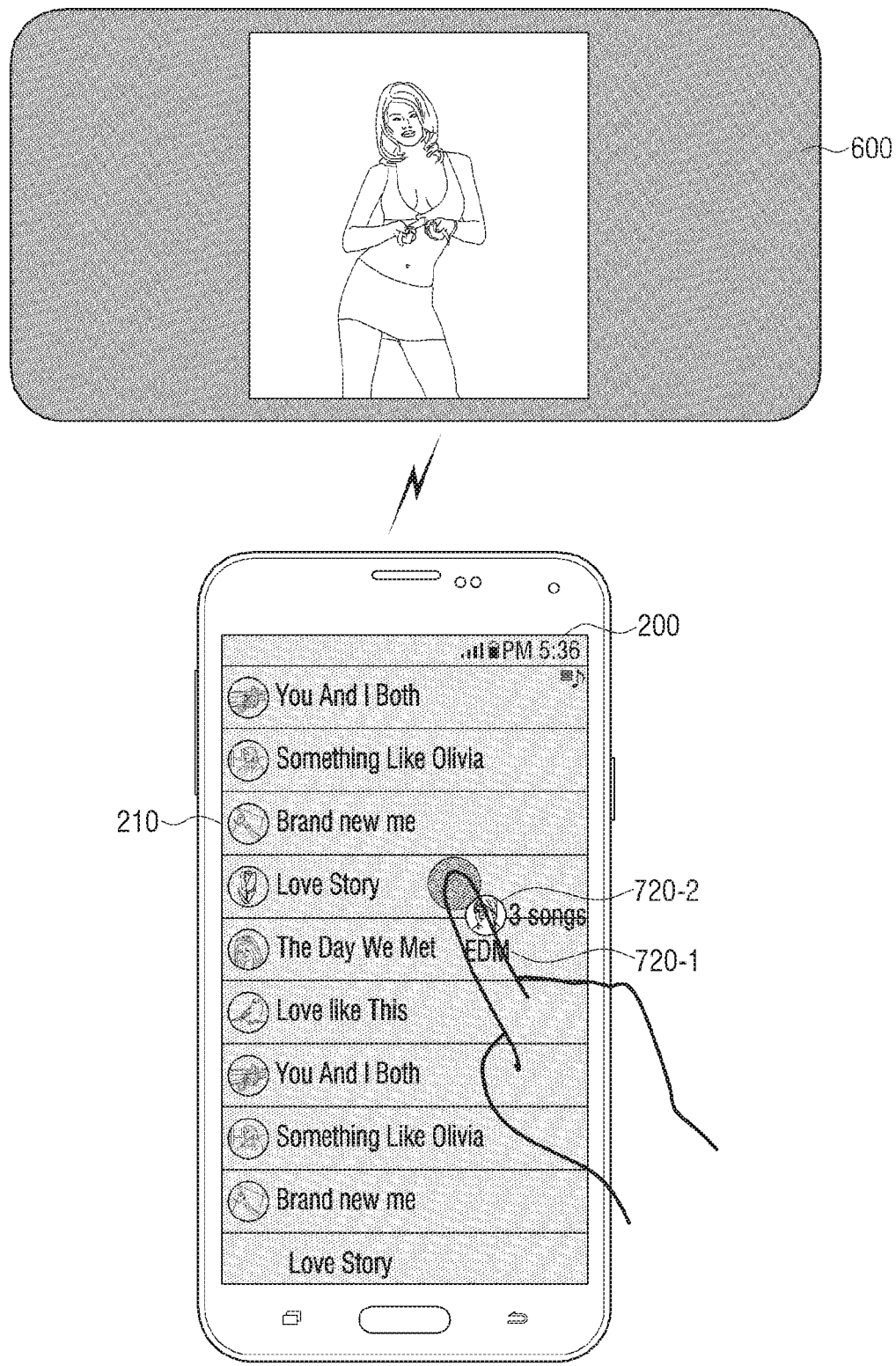
Figure 7C:
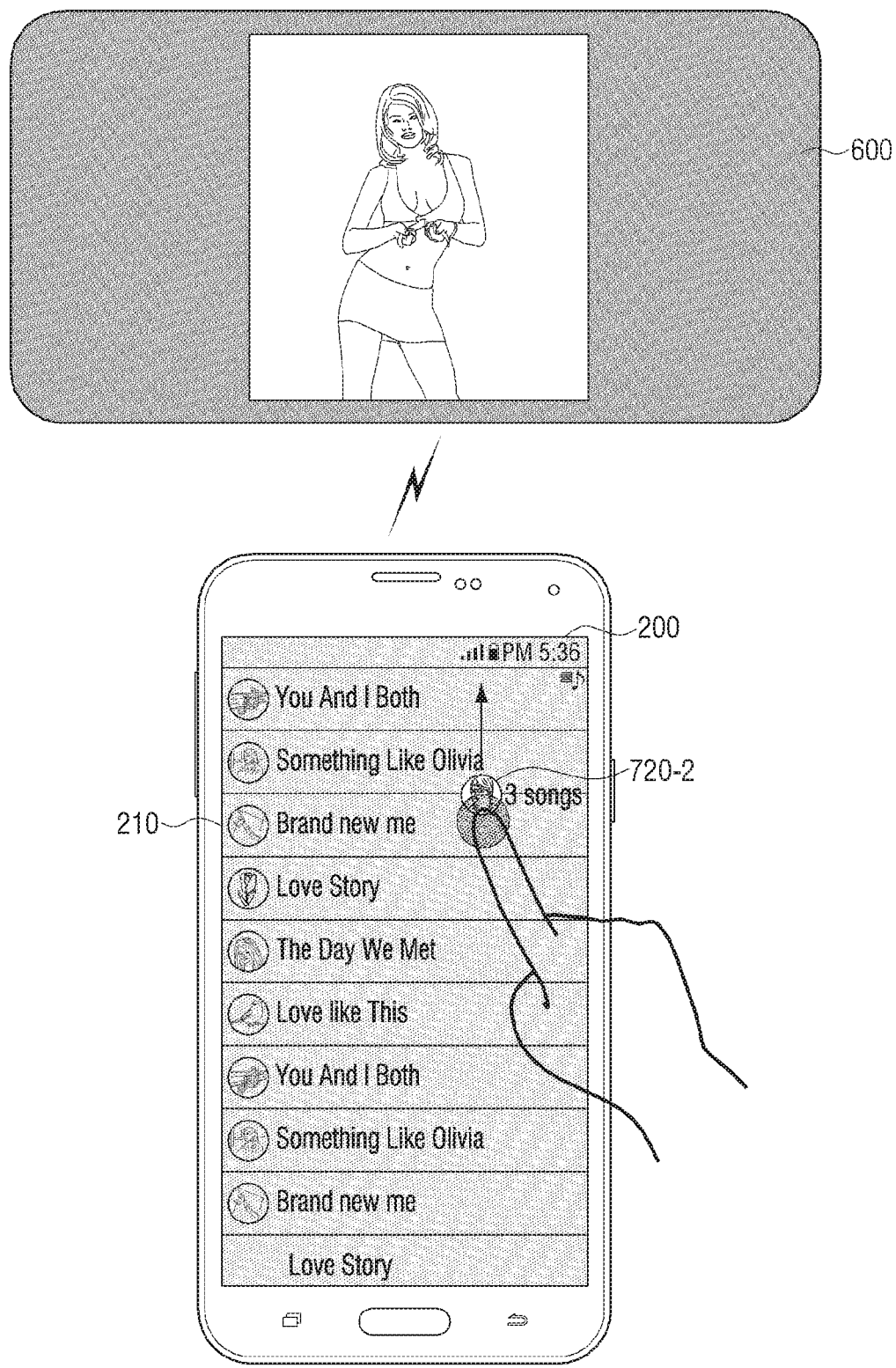

As illustrated in FIG. 7B, if a user interaction selecting the second category item 720-2 is sensed while the first category item 720-1 and the second category item 720-2 are displayed and then, as illustrated in FIG. 7C, a drag interaction of dragging the second category item 720-2 in an upper direction is sensed, the processor 270 may search a content having category information corresponding to the second category item 720-2 from among the plurality of contents included in the content list. The processor 270 may control the communicator 220 to transmit information regarding a retrieved content to an external apparatus.

Figure 7D:
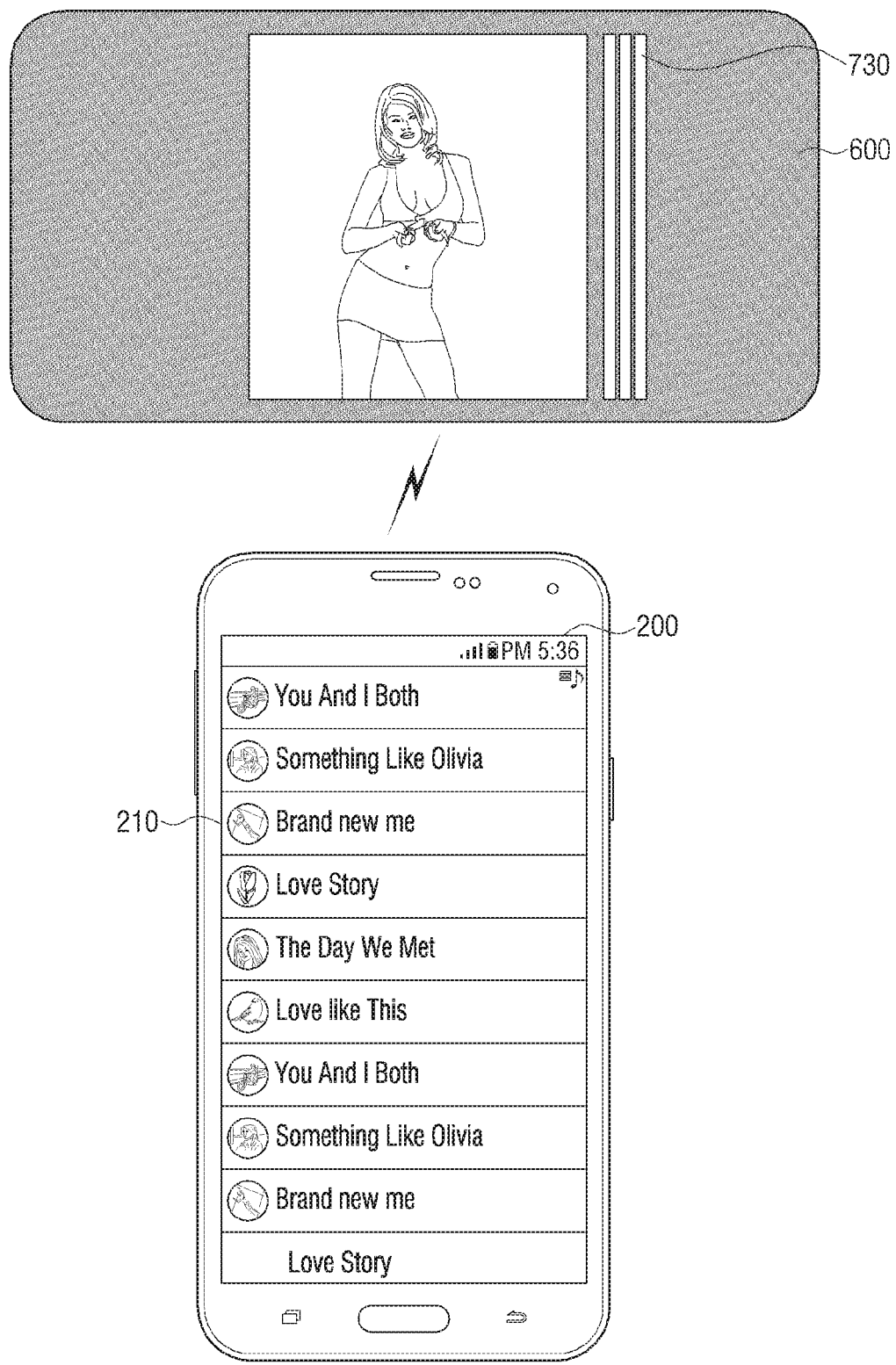

In this case, if information regarding the retrieved content is received, the external apparatus 600 may add the content retrieved by the electronic apparatus 200 to the reproduction list or reproduce the content. In particular, the external apparatus 600 may display an UI element corresponding to the number of retrieved contents. For example, if the number of retrieved contents is three, the external apparatus 600 may display three UI elements 730 in the form of bar as illustrated in FIG. 7D.

In addition, if a user interaction selecting a specific icon included in the content list is sensed, the processor 270 may control the display 210 to display a content list of the external apparatus including contents which are reproduced by the external apparatus.

Figure 8A:
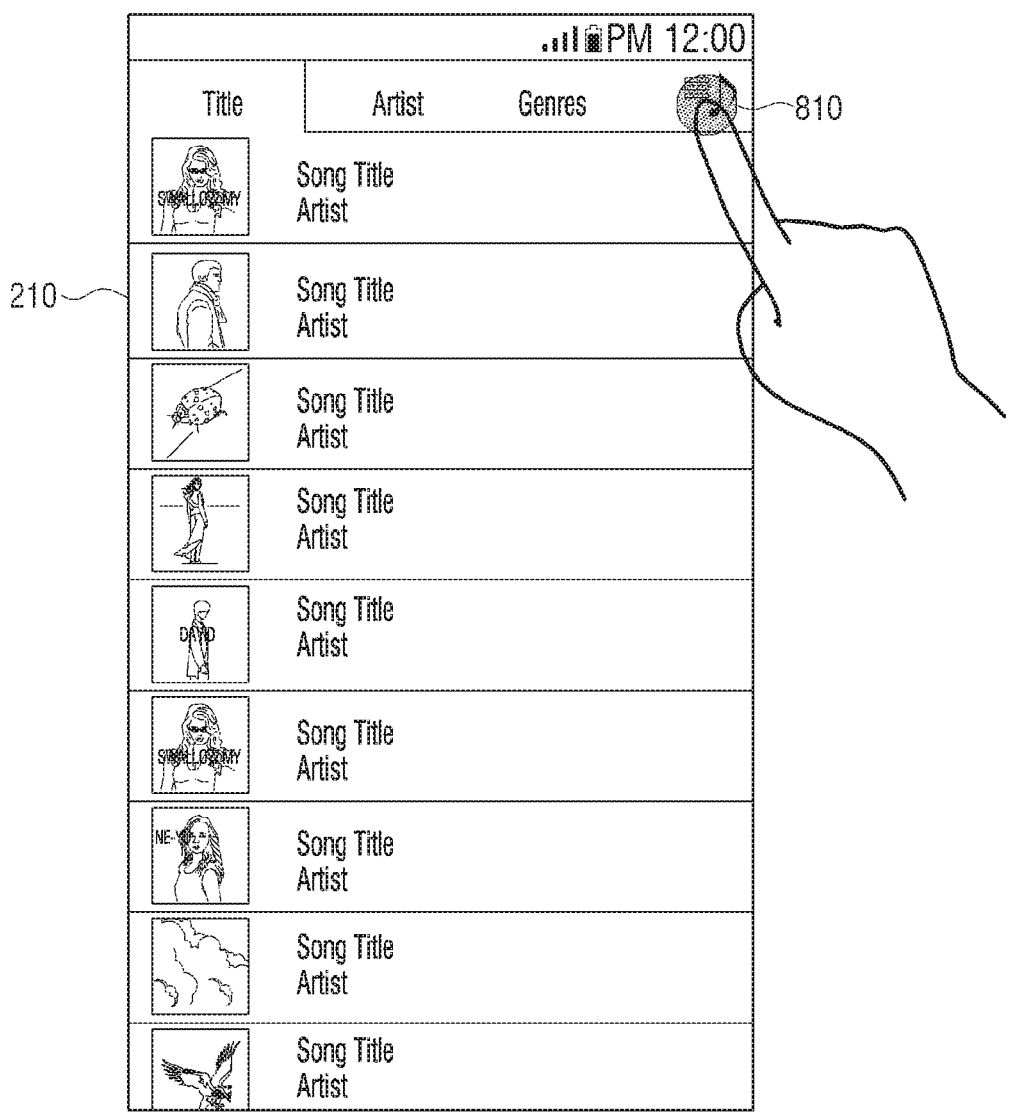
Figure 8B:
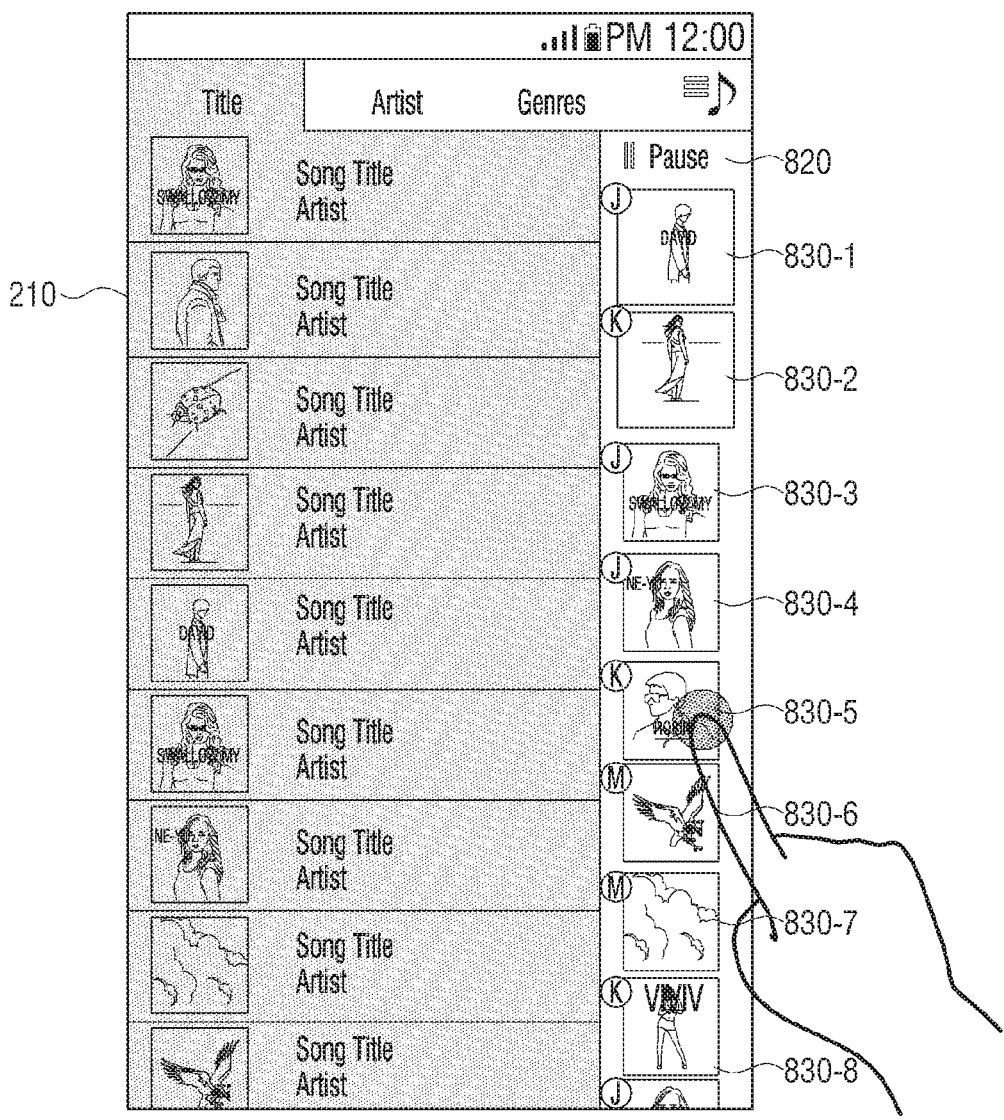

Specifically, as illustrated in FIG. 8A, if a specific icon 810 is selected while a first content list of the electronic apparatus 200 is selected, the processor 270 may control the display 210 to display a second content list 820 of the external apparatus 600 which includes the first to the eighth display items 830-1 to 830-8 as illustrated in FIG. 8B. In this case, the display items included in the second content list 820 may include an icon (e.g., k, j, m, etc.) representing information regarding a user who adds contents corresponding to the display items. In other words, the second content list 820 may be a content list of the external apparatus 600 which is generated based on the information of the contents which are transmitted from a plurality of electronic apparatuses.

Figure 8C:
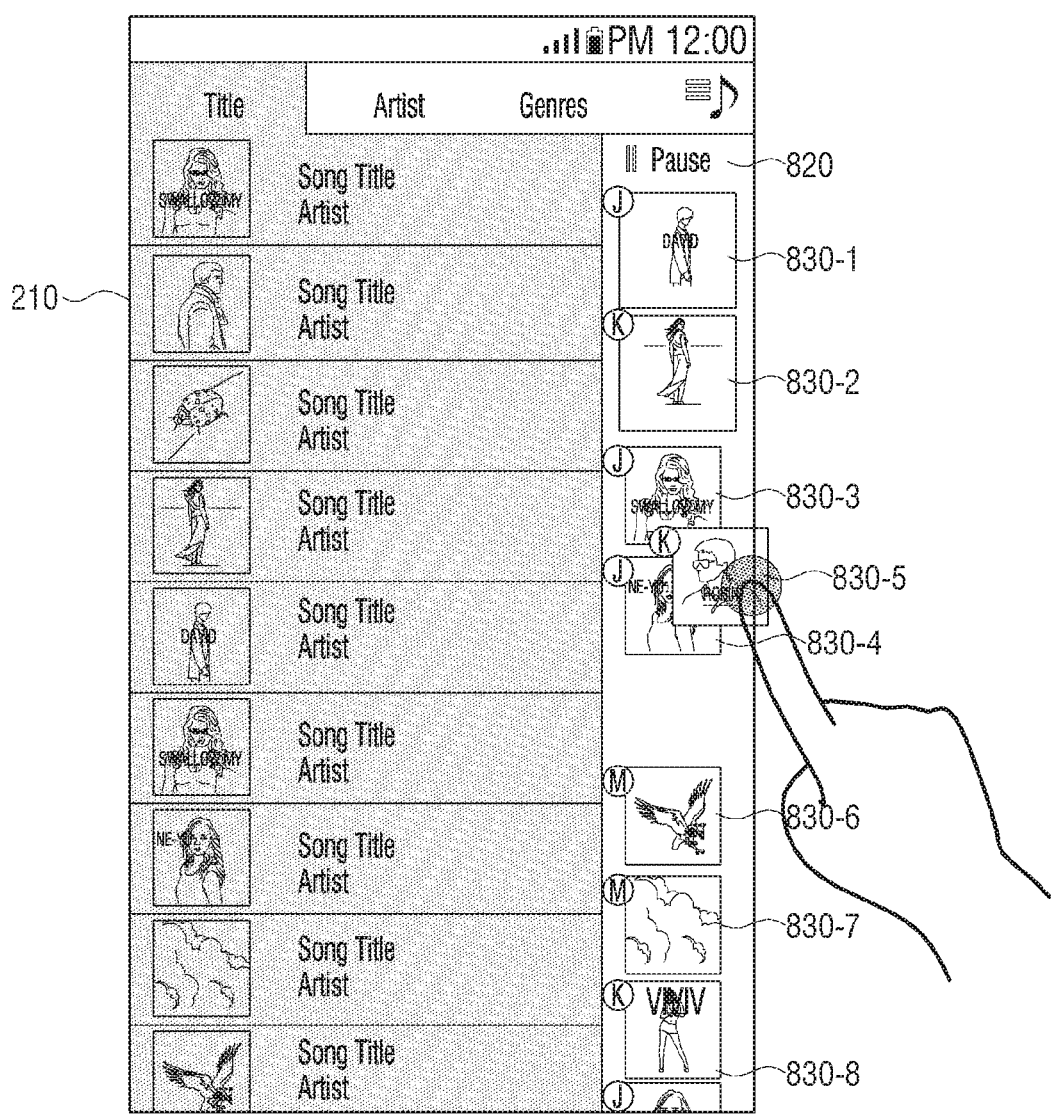
Figure 8D:
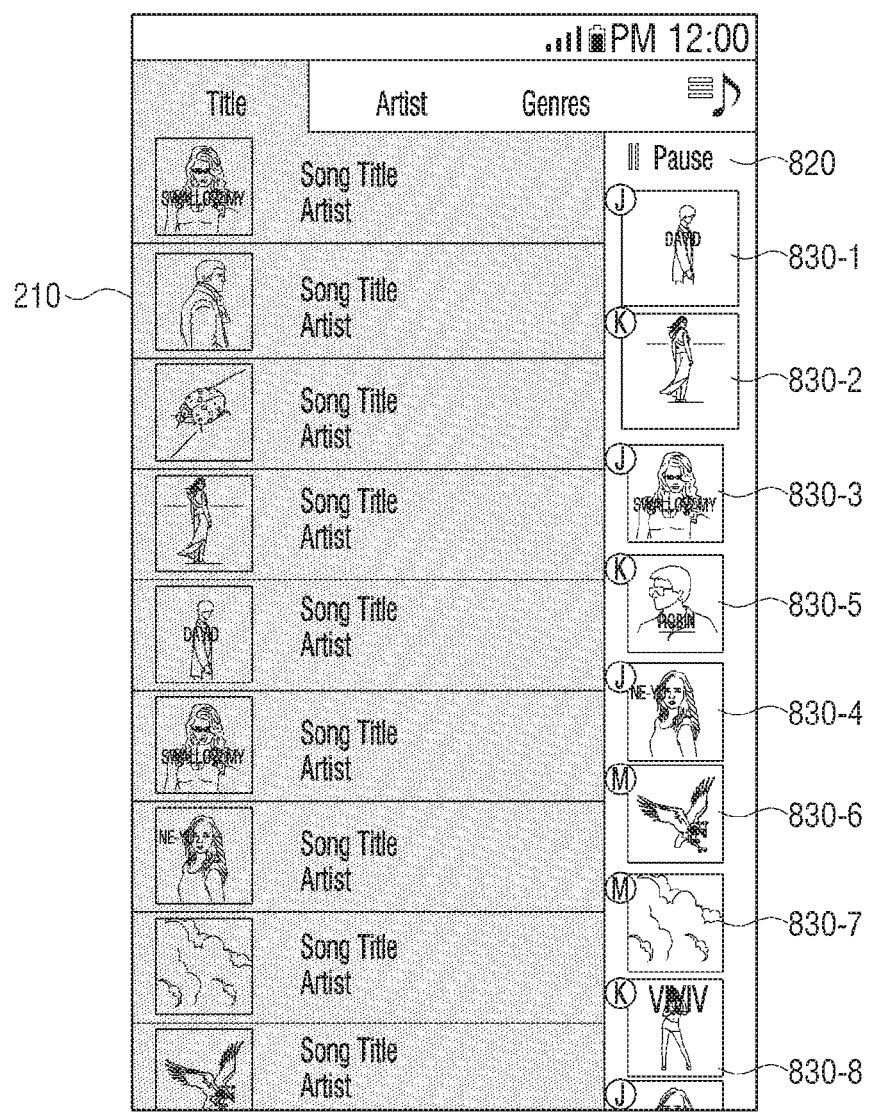

In addition, if a user interaction of touching a fifth display item 830-5 is sensed as illustrated in FIG. 8B and then, a user interaction of dragging the fifth display item 830-5 to the position of a fourth display item 830-4 is sensed as illustrated in FIG. 8C, the processor 270 may control the display 210 to replace the position of the fourth display item 830-4 with the position of the fifth display item 830-5 and display the display items as illustrated in FIG. 8D.

Figure 9:
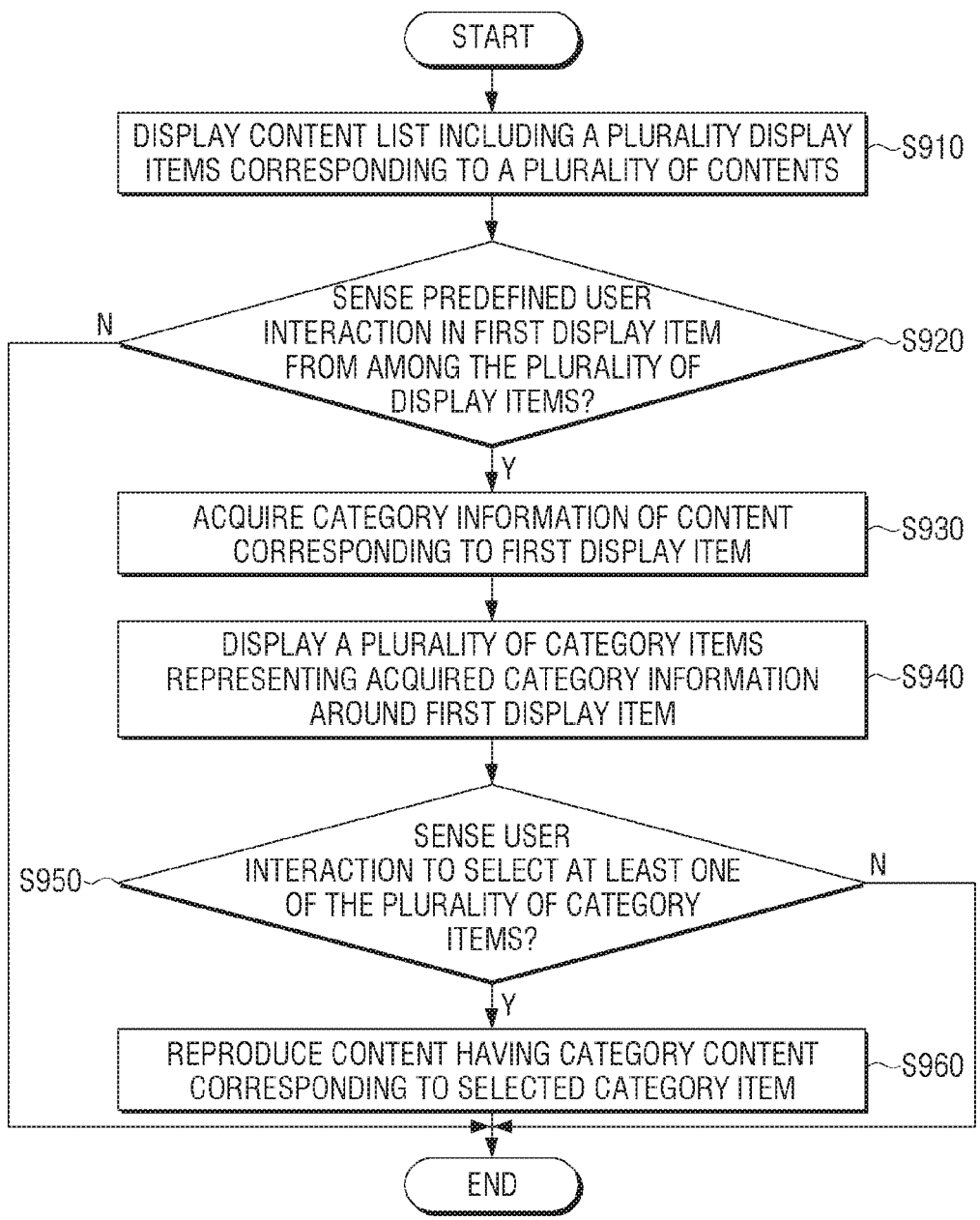
FIG. 9 is a flowchart provided to explain a controlling method of an electronic apparatus according to an exemplary embodiment.

FIG. 9 is a flowchart provided to explain the controlling method of the electronic apparatus 200 according to an exemplary embodiment.

First of all, the electronic apparatus 200 displays a content list including a plurality of display items corresponding to a plurality of contents (S910).

The electronic apparatus 200 determines whether a predefined user interaction is sensed in the first display item from among the plurality of display items. In this case, the predefined user interaction may be a touch-and-hold interaction of touching the first display item and holding the touch for a predetermined time.

If the predefined user interaction is sensed in the first display item (S920—Y), the electronic apparatus 200 acquires category information of the content corresponding to the first display item (S930). In this case, the electronic apparatus 200 may acquire metadata of the content corresponding to the first display item or receive category information of the content corresponding to the first display item from an external server.

The electronic apparatus 200 displays a plurality of category items representing the acquired category information around the first display item. In this case, the electronic apparatus 200 may display the first display item around which the category items are displayed differently from other display items from among the plurality of display items.

The electronic apparatus 200 senses a user interaction selecting at least one of the plurality of category items (S950).

If a user interaction selecting at least one category item is sensed (S950—Y), the electronic apparatus 200 reproduces the content having the category information corresponding to the selected category item (S960).

According to the above-described various exemplary embodiments, the electronic apparatus 200 may provide category information regarding a specific content and simultaneously, search and provide a different content having the same category information. Accordingly, a user may not only check category information regarding a preferred content more easily but also search a content having the same type of category as his or her preferred content more conveniently.

An apparatus (e.g., modules or the electronic apparatus 200) or a method (e.g., operations) according to the various exemplary embodiments may be performed by at least one computer (e.g., a processor) which executes instructions included in at least one program from among, e.g., programs maintained by a computer readable storage media.

If the instructions are executed by a computer (e.g., a processor), the at least one computer may perform a function corresponding to the instructions. Here, the computer readable storage media may be, e.g., the memory 230.

The program may include a storage media which can be readable by a computer, such as a hard disk, a floppy disk, magnetic media (e.g., magnetic tape), optical media (e.g., compact disc read only memory (CD-ROM)), a digital versatile disk (DVD), magneto-optical media (e.g., a floptical disk), a hardware device (e.g., ROM, RAM, or flash memory, etc.). In this case, the storage media is generally included as a part of the configuration of the electronic apparatus 200, but it may be mounted through a port of the electronic apparatus 200, or may be included in an external apparatus (e.g., cloud, server, or other electronic apparatuses). In addition, the program may be divided and stored in a plurality of storage media. In this case, at least a part of the plurality of the storage media may be positioned in an external apparatus of the electronic apparatus 200.

The instructions may include a machine language code that is made by a compiler and a high-level language code that may be executed by a computer by using an interpreter or the like. The hardware device described above may be configured to operate as one or more software modules in order to perform operations of various exemplary embodiments, and vice versa.

Although exemplary embodiments have been shown and described, it will be appreciated by those skilled in the art that changes may be made to these exemplary embodiments without departing from the principles and spirit of the present disclosure. Accordingly, the scope of the present disclosure is not construed as being limited to the described exemplary embodiments, but is defined by the appended claims as well as equivalents thereto.

What is claimed is:

1. A method of controlling an electronic apparatus, the method comprising:
    displaying a first content list including a plurality of display items corresponding to a plurality of contents having at least two different categories;
    acquiring category information of a content corresponding to a first display item in response to sensing a first user interaction corresponding to the first display item from among the plurality of display items;
    displaying a plurality of category items representing the acquired category information around the first display item;
    based on a second user interaction of selecting a category item of the plurality of category items, displaying at least one selected display item of the plurality of display items having a same category as the selected category item, and at least one unselected display item of the plurality of display items having a different category from the selected category item, in different visual attributes on a same display screen; and
    transmitting information regarding the selected at least one of the plurality of category items to an external apparatus in response to sensing a third user interaction of selecting the at least one among the plurality of category items and a drag interaction of dragging the selected at least one of the plurality of category items in a predefined direction.

2. The method as claimed in claim 1, wherein the first user interaction is a touch-and-hold interaction of a first touch corresponding to the first display item and maintaining the first touch for a predefined period of time, and
    wherein the second user interaction is a drag interaction of touching the first display item and dragging towards the at least one of the plurality of category items.

3. The method as claimed in claim 2, comprising reproducing the content corresponding to the first display item in response to sensing a tap interaction corresponding to the first display item for less than the predefined period of time.

4. The method as claimed in claim 1, wherein the displaying the at least one selected display item and the at least one unselected display item on the same display screen comprises:
displaying the at least one selected display item and the at least one unselected display item while maintaining a display arrangement of the at least one selected display item and the at least one unselected display item before and after the second user interaction.

5. The method as claimed in claim 1, wherein the displaying the plurality of category items comprises displaying the first display item differently from remaining display items of the plurality of display items, excluding the first display item.

6. The method as claimed in claim 1, wherein the content is one from among a music content, a video content and a photo content.

7. The method as claimed in claim 1, further comprising displaying a second content list of an external apparatus in response to sensing a fourth user interaction of selecting a specific icon included in the first content list along with the first content list, the second content list including contents reproduced by the external apparatus.

8. An electronic apparatus, comprising:
a display configured to display a first content list including a plurality of display items corresponding to a plurality of contents having at least two different categories;
an input interface configured to sense a user interaction;
a communicator; and
a processor configured to:
control the display to display the first content list including the plurality of display items corresponding to the plurality of contents,
acquire category information corresponding to a first display item in response to the input interface sensing a first user interaction selecting the first display item from among the plurality of display items,
control the display to display a plurality of category items representing the acquired category information around the first display item,
based on a second user interaction of selecting a category item of the plurality of category items, display at least one selected display item of the plurality of display items having a same category as the selected category item, and at least one unselected display item of the plurality of display items having a different category from the selected category item, in different visual attributes on a same screen of the display; and
control the communicator to transmit information regarding the selected at least one of the plurality of category items to an external apparatus in response to the input interface sensing a third user interaction of selecting the at least one among the plurality of category items and a drag interaction of dragging the at least one of the plurality of category items in a predefined direction.

9. The electronic apparatus as claimed in claim 8, wherein the first user interaction is a touch-and-hold interaction of a first touch corresponding to the first display item and maintaining the first touch for a predefined period of time, and
wherein the second user interaction is a drag interaction of touching the first display item and dragging towards the at least one of the plurality of category items.

10. The electronic apparatus as claimed in claim 9, wherein the processor is further configured to reproduce a content of the plurality of contents corresponding to the first display item in response to the input interface sensing a tap interaction corresponding to the first display item for less than the predefined period of time.

11. The electronic apparatus as claimed in claim 8, further comprising a communicator,
wherein the processor is further configured to acquire and analyze metadata of the first display item from an external server through the communicator.

12. The electronic apparatus as claimed in claim 8, wherein the processor is further configured to control the display to display the first display item differently from remaining display items of the plurality of display items, excluding the first display item.

13. The electronic apparatus as claimed in claim 8, wherein the content is one from among a music content, a video content and a photo content.

14. The electronic apparatus as claimed in claim 8, wherein the processor is further configured to control the display to display a second content list of an external apparatus in response to the input interface sensing a fourth user interaction of selecting a specific icon included in the first content list along with the first content list, the second content list including contents reproduced by the external apparatus.

15. A non-transitory computer readable recording medium having embodied thereon a program, which when executed by a processor of an electronic apparatus causes the electronic apparatus to execute a method, the method including:
displaying a content list including a plurality of display items corresponding to a plurality of contents having at least two different categories;
acquiring category information of a content corresponding to a first display item in response to sensing a first user interaction corresponding to the first display item from among the plurality of display items;
displaying a plurality of category items representing the acquired category information around the first display item;
based on a second user interaction of selecting a category item of the plurality of category items, displaying at least one selected display item of the plurality of display items having a same category as the selected category item, and at least one unselected display item of the plurality of display items having a different category from the selected category item, in different visual attributes on a same display screen; and
transmitting information regarding the selected at least one of the plurality of category items to an external apparatus in response to sensing a third user interaction of selecting the at least one among the plurality of category items and a drag interaction of dragging the selected at least one of the plurality of category items in a predefined direction.

16. A method of controlling an electronic apparatus, the method comprising:
displaying a first content list including a plurality of display items corresponding to a plurality of contents having at least two different categories;
acquiring category information of a content corresponding to a first display item in response to sensing a first user interaction corresponding to the first display item from among the plurality of display items;

displaying a plurality of category items representing the acquired category information around the first display item;

based on a second user interaction of selecting a category item of the plurality of category items, displaying at least one selected display item of the plurality of display items having a same category as the selected category item, and at least one unselected display item of the plurality of display items having a different category from the selected category item, in different visual attributes on a same display screen and displaying a UI for reproduction on the selected category item; and transmitting information regarding the selected at least one of the plurality of category items to an external apparatus in response to sensing a third user interaction of selecting the UI for reproduction.

17. An electronic apparatus, comprising:

a display configured to display a first content list including a plurality of display items corresponding to a plurality of contents having at least two different categories;

an input interface configured to sense a user interaction;

a communicator; and a processor configured to:

control the display to display the first content list including the plurality of display items corresponding to the plurality of contents, acquire category information corresponding to a first display item in response to the input interface sensing a first user interaction selecting the first display item from among the plurality of display items, control the display to display a plurality of category items representing the acquired category information around the first display item, based on a second user interaction of selecting a category item of the plurality of category items, display at least one selected display item of the plurality of display items having a same category as the selected category item, and at least one unselected display item of the plurality of display items having a different category from the selected category item, in different visual attributes on a same screen of the display and display a UI for reproduction on the selected category item; and control the communicator to transmit information regarding the selected at least one of the plurality of category items to an external apparatus in response to the input interface sensing a third user interaction of selecting the UI for reproduction.

* * * * *